(12) United States Patent
Kimoto et al.

(10) Patent No.: US 7,827,790 B2
(45) Date of Patent: Nov. 9, 2010

(54) CONTROLLER FOR INTERNAL COMBUSTION ENGINE WITH SUPERCHARGER

(75) Inventors: Kayoko Kimoto, Kariya (JP); Daiji Isobe, Toyohashi (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 0 days.

(21) Appl. No.: 11/364,067

(22) Filed: Mar. 1, 2006

(65) Prior Publication Data
US 2006/0196182 A1 Sep. 7, 2006

(30) Foreign Application Priority Data

| Mar. 2, 2005 | (JP) | 2005-057568 |
| Mar. 2, 2005 | (JP) | 2005-057569 |
| Mar. 2, 2005 | (JP) | 2005-057570 |

(51) Int. Cl.
*F02B 33/44* (2006.01)

(52) U.S. Cl. .......................... 60/607; 60/608

(58) Field of Classification Search ............ 60/607, 60/608
See application file for complete search history.

(56) References Cited

U.S. PATENT DOCUMENTS

| 6,062,026 | A | 5/2000 | Woollenweber et al. |
| 6,279,550 | B1 | 8/2001 | Bryant |
| 6,637,204 | B2 * | 10/2003 | Ellmer et al. ............ 60/606 |
| 6,637,205 | B1 * | 10/2003 | Ahmad et al. ............ 60/608 |
| 6,722,129 | B2 | 4/2004 | Criddle et al. |
| 6,729,124 | B2 | 5/2004 | Baeuerle et al. |
| 6,880,337 | B2 * | 4/2005 | Masuda ................ 60/608 |
| 6,883,324 | B2 | 4/2005 | Igarashi et al. |
| 6,889,503 | B2 | 5/2005 | Hoecker et al. |
| 6,920,755 | B2 | 7/2005 | Hoecker et al. |
| 6,920,756 | B2 | 7/2005 | Hoecker et al. |
| 6,928,819 | B2 | 8/2005 | Baeuerle et al. |
| 6,938,420 | B2 | 9/2005 | Kawamura et al. |
| 6,957,535 | B2 | 10/2005 | Sumser et al. |

(Continued)

FOREIGN PATENT DOCUMENTS

JP 1-117933 5/1989

(Continued)

OTHER PUBLICATIONS

US Divisional appln. filed Oct. 17, 2007, Kimoto and Isobe.

(Continued)

*Primary Examiner*—Thomas Denion
*Assistant Examiner*—Douglas J. Duff
(74) *Attorney, Agent, or Firm*—Nixon & Vanderhye PC

(57) ABSTRACT

A torque base control unit calculates target torque based on an accelerator position and engine speed. The control unit further executes calculation of target airflow rate, calculation of target intake pressure, and calculation of target boost pressure based on the target torque. Target throttle position is calculated based on the target airflow rate, target intake pressure, target boost pressure, actual boost pressure, and throttle passed intake temperature. An assist control unit calculates target turbine power based on the target airflow rate and the target boost pressure calculated by the torque base control unit and calculates actual turbine power based on exhaust information. Assist power of a motor attached to a turbocharger is calculated based on the power difference between the target turbine power and the actual turbine power.

8 Claims, 25 Drawing Sheets

U.S. PATENT DOCUMENTS

| | | |
|---|---|---|
| 7,043,916 B2 * | 5/2006 | Masuda ................. 60/608 |
| 7,398,149 B2 * | 7/2008 | Ueno et al. ............. 701/108 |
| 2001/0054287 A1 | 12/2001 | Hoecker et al. |
| 2003/0005695 A1 * | 1/2003 | Allen et al. ............. 60/608 |
| 2004/0194465 A1 | 10/2004 | Bolz et al. |
| 2006/0207252 A1 | 9/2006 | Kimoto et al. |

FOREIGN PATENT DOCUMENTS

| | | |
|---|---|---|
| JP | 11-280510 | 10/1999 |
| JP | 2001-152915 | 6/2001 |
| JP | 2003-239754 | 8/2003 |
| JP | 2005-188435 | 7/2005 |

OTHER PUBLICATIONS

KR Examination Report (with English translation) dated Feb. 16, 2007.

U.S. Appl. No. 11/365,814, filed Mar. 2, 2006, Isobe et al.

Office Action in the divisional U.S. Appl. No. 11/907,763 dated Mar. 31, 2008.

Final Office Action dated Nov. 12, 2008 in U.S. Appl. No. 11/907,763.

Official Action dated May 14, 2009 issued in co-pending U.S. Appl. No. 11/907,763 of Kimoto, et al, filed Oct. 17, 2007.

Official Action dated Dec. 18, 2009 issued in co-pending U.S. Appl. No. 11/907,763 of Kimoto, et al, filed Oct. 17, 2007.

\* cited by examiner

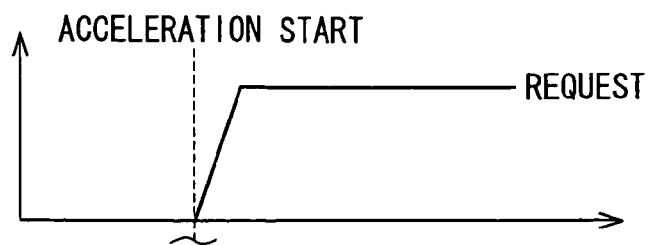
FIG. 16A ACCELERATOR POSITION
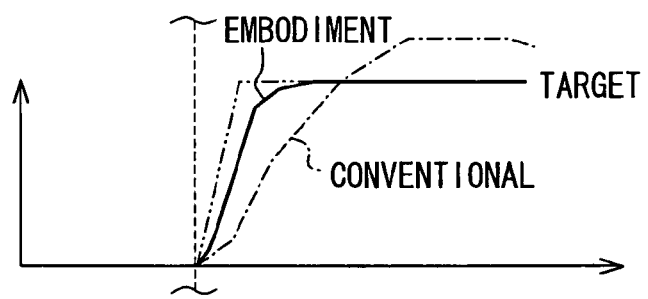
FIG. 16B TORQUE
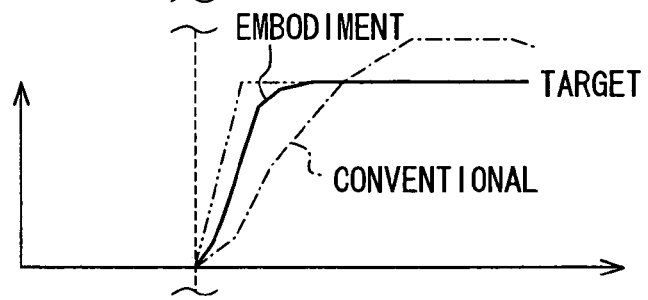
FIG. 16C BOOST PRESSURE
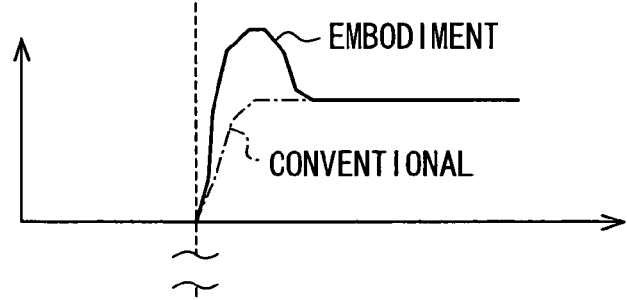
FIG. 16D THROTTLE POSITION
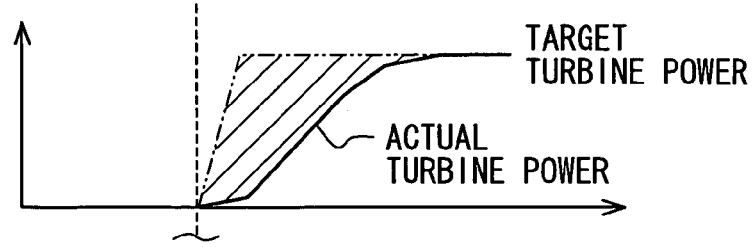
FIG. 16E TURBINE POWER
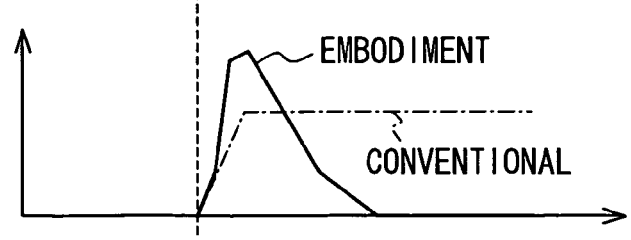
FIG. 16F ASSIST POWER

ACCELERATION START

AIRFLOW RATE

TARGET AIRFLOW RATE
ACTUAL AIRFLOW RATE

TARGET TURBINE POWER

ACTUAL TURBINE POWER

ASSIST POWER

THROTTLE POSITION

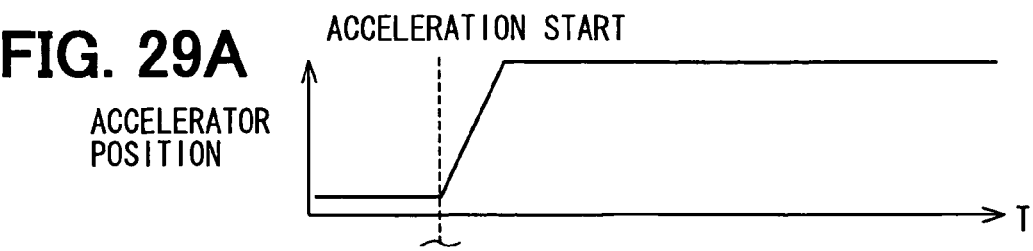
FIG. 29A ACCELERATOR POSITION
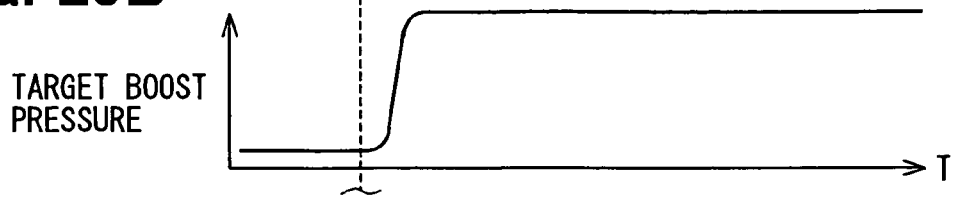
FIG. 29B TARGET BOOST PRESSURE
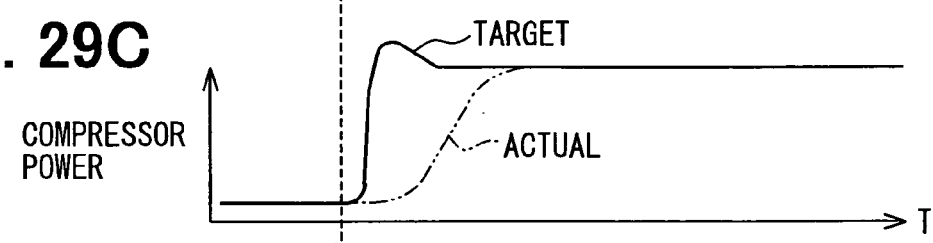
FIG. 29C COMPRESSOR POWER
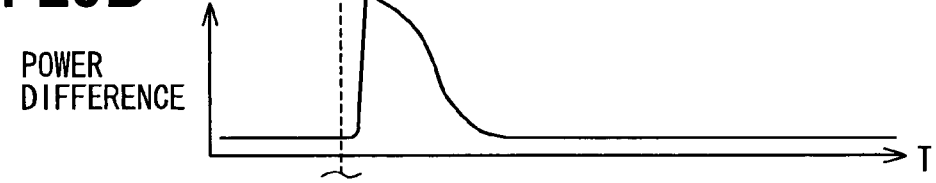
FIG. 29D POWER DIFFERENCE
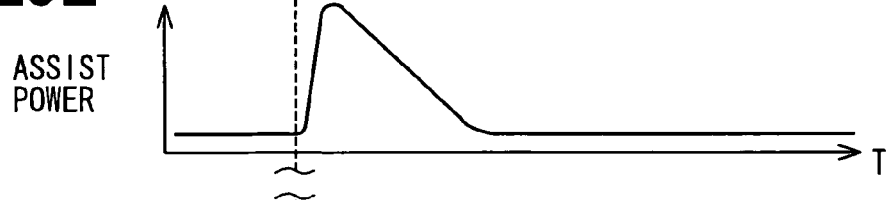
FIG. 29E ASSIST POWER
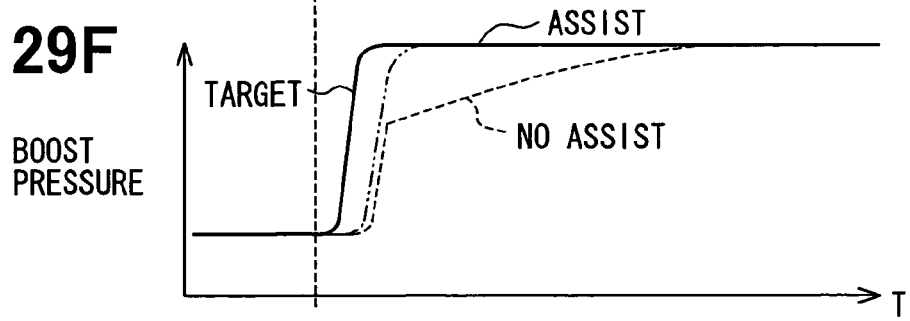
FIG. 29F BOOST PRESSURE FIG. 34A ACCELERATOR POSITION
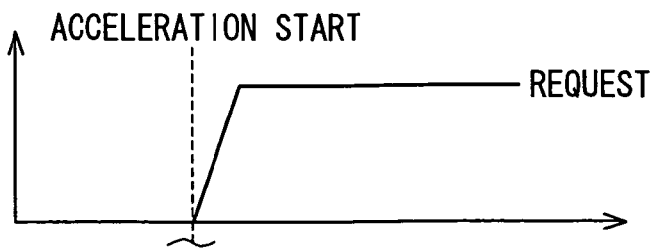
FIG. 34B TORQUE
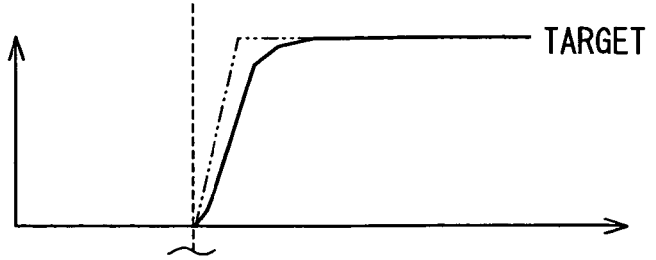
FIG. 34C BOOST PRESSURE
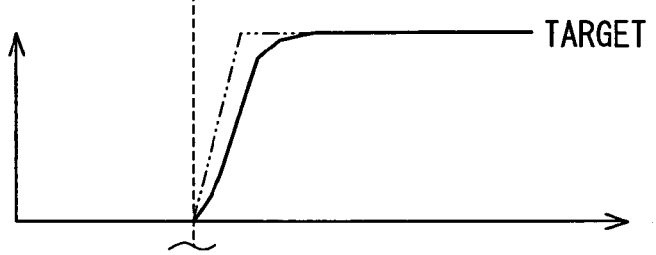
FIG. 34D FUEL INJECTION AMOUNT
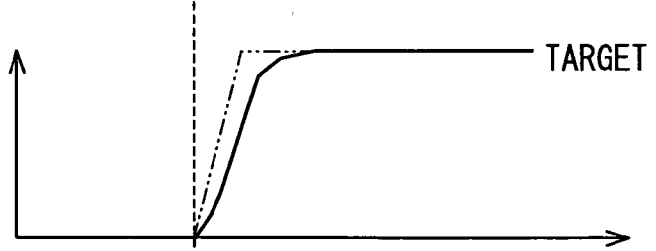
FIG. 34E TURBINE POWER
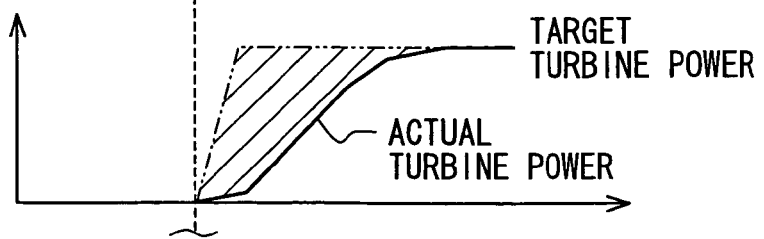
FIG. 34F ASSIST POWER
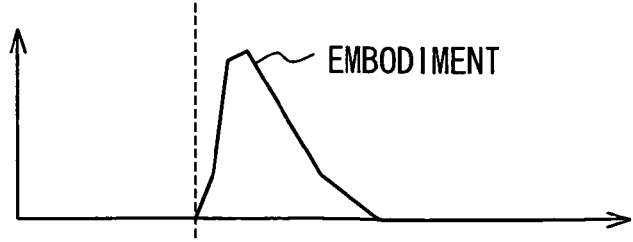

CONTROLLER FOR INTERNAL COMBUSTION ENGINE WITH SUPERCHARGER

CROSS-REFERENCE TO RELATED APPLICATION

This application is based on Japanese Patent Applications No. 2005-57568 field on Mar. 2, 2005, No. 2005-57569 filed on Mar. 2, 2005, and No. 2005-57570 filed on Mar. 2, 2005, the disclosure of which is incorporated herein by reference.

FIELD OF THE INVENTION

The present invention relates to a controller applied to an internal combustion engine having a supercharger such as a turbocharger, the controller suitably controlling assist power to the supercharger.

BACKGROUND OF THE INVENTION

As a supercharger for supercharging intake air by using exhaust power, a turbocharger is generally known. In recent years, an electrically-assisted turbocharger is developed in which an electric motor or the like is attached to the rotary shaft of the turbocharger and which assists exhaust power in accordance with an operating state of an internal combustion engine.

A controller disclosed in JP-11-117933A controls current passed to an electric motor on the basis of an accelerator stroke amount and accelerator stroke speed, thereby advancing supercharging operation of a turbocharger. A controller disclosed in JP-11-280510A controls the speed of opening the throttle and current passed to an electric motor in accordance with a change amount of an accelerator position and, meanwhile, corrects an auxiliary power amount in accordance with engine speed and a load value. In such a manner, supercharging according to the accelerator operation of the driver is realized to improve drivability. A controller disclosed in JP-2003-239754A determines power to be supplied to an electric motor on the basis of a power determination reference such as a map in which the relation between target boost pressure and power supplied to the electric motor is specified in advance and, further, corrects the power determination reference on the basis of actual boost pressure fluctuations with respect to the power supplied to the electric motor. By the operations, the boost pressure control which is always optimum can be executed.

In the conventional methods, however, open-loop control is executed, and it is difficult to control the assist amount properly. In this case, when the assist amount increases unnecessarily, there is the possibility that fuel consumption deteriorates. There is also the possibility that supercharging performance (acceleration performance) intended by the driver cannot be obtained at the time of acceleration or the like, and drivability deteriorates.

JP-2002-21573A discloses a technique of providing an auxiliary compressor as an auxiliary supercharging device on the upstream or downstream side of a turbocharger in an intake path. The auxiliary compressor is operated by, for example, an electric motor.

However, the above publication does not disclose a control method of how to control the auxiliary compressor. It is therefore difficult to operate the auxiliary compressor with a proper control amount. For example, the configuration in which the auxiliary compressor is operated by an electric motor or the like has the possibility that when the auxiliary compressor is operated unnecessarily, a power generation amount of an alternator or the like increases and, as a result, fuel consumption deteriorates. When an operation amount of the auxiliary compressor is insufficient, supercharging performance (acceleration performance) intended by the driver cannot be obtained at the time of acceleration or the like, so that drivability may deteriorate.

SUMMARY OF THE INVENTION

A main object of the present invention is to provide a controller for an internal combustion engine with a supercharger having a power assist device such as an electric motor, capable of controlling power assist of the power assist device to be proper.

A controller of the present invention is applied to, as a precondition, an internal combustion engine having a supercharger for supercharging intake air by exhaust power and a power assist device attached to the supercharger and directly assisting power of the supercharger. In the internal combustion engine, output torque of the internal combustion engine is controlled by adjusting an intake airflow rate by airflow rate adjusting means. Particularly, target power of the supercharger is calculated on the basis of airflow rate information, and actual power of the supercharger (actual supercharger power) is calculated. On the basis of the target power and the actual power, an assist amount of the power assist device is calculated. On the basis of the calculated assist amount, the power assist device is controlled. For example, it is desirable to make comparison between the target power and the actual power and calculate the assist amount on the basis of the power difference.

In short, by the comparison between the target power and the actual power of the supercharger, an insufficient amount of power for inherently necessary supercharger power can be grasped, and the power assist device can be driven by an assist amount corresponding to the insufficient amount. For example, the difference between the target power and the actual power is obtained, and the power assist device is controlled by an assist amount calculated on the basis of the power difference. In such a case, by setting the insufficient amount for the target power as an assist amount, the supercharger power can be assisted efficiently. Since the assist amount is calculated by comparison of the powers, assist control can be performed more directly with higher response as compared with the case of calculating the assist amount by using another parameter such as boost pressure. For example, the behavior of the boost pressure is a result of the assist control. In the case where the assist control is performed on the basis of the boost pressure, a delay occurs in the control. The present invention can prevent such an inconvenience. Consequently, the power assist of the power assist device can be properly controlled. Moreover, the fuel consumption, drivability, and the like can be improved.

A controller of the present invention is applied to, as a precondition, an internal combustion engine having a supercharger for supercharging intake air by exhaust power and an auxiliary supercharging device provided on the upstream or downstream side of the supercharger in an intake path and operated on power other than exhaust as a power source. In the internal combustion engine, by adjusting an intake airflow rate by airflow rate adjusting means, output torque of the internal combustion engine is controlled. In particular, target power of the supercharger is calculated on the basis of information of intake airflow rate of the internal combustion engine, and actual power of the supercharger (actual supercharger power) is calculated. An assist amount of the auxiliary supercharging device is calculated on the basis of target power and actual power, and the auxiliary supercharging device is controlled with the calculated assist amount. For example, it is preferable to make comparison between target power and actual power and calculate an assist amount on the basis of the power difference.

As a precondition, a controller of the present invention is applied to an internal combustion engine having a supercharger for supercharging intake air by exhaust power and a power assist device which is attached to the supercharger and directly assists power of the supercharger, and the controller controls output torque of the internal combustion engine by adjusting a fuel injection amount of fuel injection means. In particular, target power and actual power of the supercharger are calculated. The target power and the actual power are compared with each other and, on the basis of the result of comparison, the assist amount of the power assist device is calculated. The power assist device is controlled with the calculated assist amount.

BRIEF DESCRIPTION OF THE DRAWINGS

FIGS. 16A to 16F are time charts showing various behaviors at the time of assist control.

FIGS. 29A to 29F are time charts showing various behaviors at the time of assist control.

FIGS. 34A to 34F are time charts showing various behaviors at the time of assist control.

DETAILED DESCRIPTION OF THE PREFERRED EMBODIMENTS

First Embodiment

An embodiment of the present invention will be described below with reference to the drawings. In the embodiment, an engine control system is constructed for an on-vehicle multi-cylinder gasoline engine as an internal combustion engine, and the engine of the control system is provided with an electrically-assisted turbocharger (hereinbelow, also called electric turbocharger) as a supercharger. First, a general schematic configuration diagram of an engine control system will be described with reference to FIG. 1.

Figure 1:
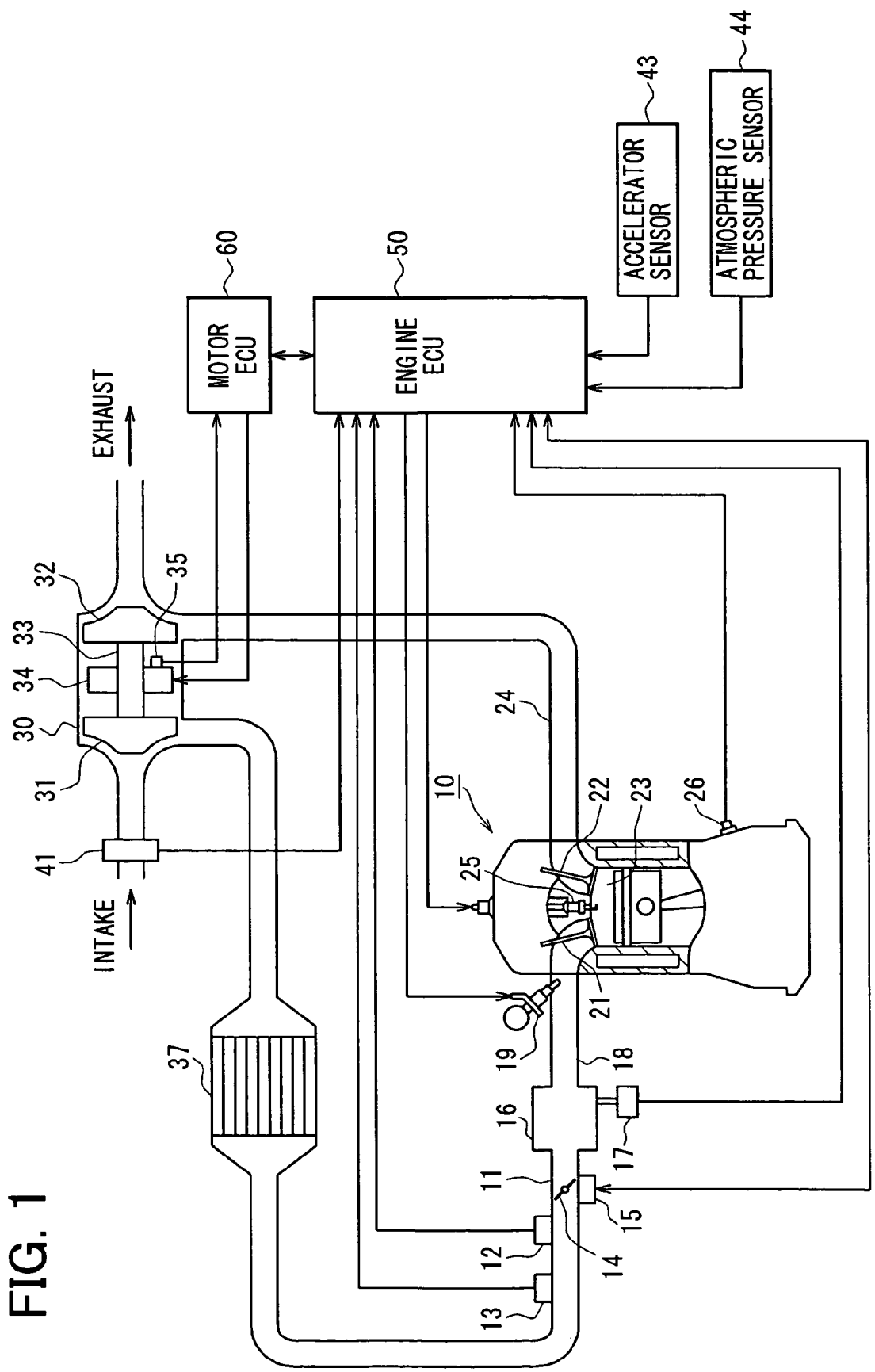
FIG. 1 is a diagram showing a schematic configuration of an engine control system in a first embodiment of the invention.

In an engine 10 shown in FIG. 1, an intake pipe 11 is provided with a throttle valve 14 as air amount adjusting means whose position is adjusted by a throttle actuator 15 such as a DC motor or the like. The throttle actuator 15 has therein a throttle position sensor for detecting the throttle position. On the upstream side of the throttle valve 14, a boost pressure sensor 12 for detecting pressure on the throttle upstream side (boost pressure generated by a turbocharger which will be described later) and an intake air temperature sensor 13 for detecting an intake temperature on the throttle upstream side are provided.

A surge tank 16 is provided on the downstream side of the throttle valve 14. The surge tank 16 is provided with an intake pressure sensor 17 (intake pipe pressure detecting means) for detecting an intake pressure on the throttle downstream side. To the surge tank 16, an intake manifold 18 for introducing air into the cylinders of the engine 10 is connected. In the intake manifold 18, a fuel injection valve 19 of an electromagnetic-drive type for injecting and supplying fuel is attached near intake ports of the cylinders.

An intake valve 21 and an exhaust valve 22 are provided for an intake port and an exhaust port, respectively, of the engine 10. By an operation of opening the intake valve 21, an air-fuel mixture is introduced into a combustion chamber 23. By an operation of opening the exhaust valve 22, exhaust gas after combustion is exhausted to an exhaust pipe 24. Spark plugs 25 are attached to the cylinder heads of cylinders of the engine 10. A high voltage is applied to the spark plug 25 in a desired ignition period via a not-shown ignition device including an ignition coil. By the application of the high voltage, a spark discharge occurs between facing electrodes of each of the spark plugs 25 and the mixture introduced in the combustion chamber 23 is ignited and provided for combustion.

To the cylinder block of the engine 10, a crank angle sensor 26 for outputting a rectangular-shaped crank angle signal at every predetermined crank angle (for example, every 30° C.) with rotation of the engine 10 is attached.

A turbocharger 30 is disposed between the intake pipe 11 and the exhaust pipe 24. The turbocharger 30 has a compressor impeller 31 provided for the intake pipe 11 and a turbine wheel 32 provided for the exhaust pipe 24. The compressor impeller 31 and the turbine wheel 32 are coupled via a shaft 33. A motor (electric motor) 34 as a power assist device is provided for the shaft 33. The motor 34 operates on power supplied from a battery (not shown) and assists rotation of the shaft 33. The motor 34 is provided with a temperature sensor 35 for detecting motor temperature.

In the turbocharger 30, the turbine wheel 32 is rotated by exhaust flowing in the exhaust pipe 24. The rotational force is transmitted to the compressor impeller 31 via the shaft 33. The intake air flowing in the intake pipe 11 is compressed by the compressor impeller 31 to perform supercharging. The air supercharged in the turbocharger 30 is cooled by an intercooler 37. After that, the cooled air is supplied to the downstream side. By cooling the intake air by the inter-cooler 37, the intake air charging efficiency is increased.

A not-shown air cleaner is provided on the most upstream side of the intake pipe 11 and an air flow meter 41 for detecting an intake air amount is provided on the downstream side of the air cleaner. In addition, in the control system, an accelerator position sensor 43 for detecting an accelerator pedal stroke amount (accelerator position) and an atmospheric pressure sensor 44 for detecting atmospheric pressure are provided.

As it is known, an engine ECU (Electronic Control Unit) 50 is constructed by using a microcomputer as a main body including a CPU, a ROM, and a RAM. By executing various control programs stored in the ROM, the engine ECU 50 executes various controls of the engine 10 in accordance with the engine operational state at each time. Specifically, various detection signals are input to the engine ECU 50 from the above-described various sensors. The engine ECU 50 computes a fuel injection amount, ignition timing, and the like on the basis of the various detection signals which are input and controls driving of the fuel injection valve 19 and the spark plug 25.

In the embodiment, electronic throttle control by so-called torque base control is executed. The throttle position is controlled to a target value by using torque generated by the engine 10 as a reference. Briefly, the engine ECU 50 computes target torque (required torque) on the basis of a detection signal of the accelerator position sensor 43, computes a target airflow rate satisfying the target torque, and calculates a target throttle position on the basis of the target airflow rate, pressures on the throttle upstream and downstream sides at each time, and the intake temperature. The engine ECU 50 controls the throttle actuator 15 by a control instruction signal based on a target throttle position and controls the throttle position to the target throttle position.

The engine ECU 50 determines a control amount of the motor 34 of the turbocharger 30 interlockinly with the torque base control so that assist power is added to the turbocharger 30 at the time of acceleration and desired boost pressure can be obtained as promptly as possible. Specifically, the engine ECU 50 computes a target assist power, power assist timing, and the like on the basis of the target airflow rate and the target boost pressure calculated according to the target torque, and outputs the computation results to a motor ECU 60. The motor ECU 60 receives a signal from the engine ECU 50, performs predetermined computing process in consideration of the motor efficiency and the like, and controls the power to be supplied to the motor 34.

Figure 2:
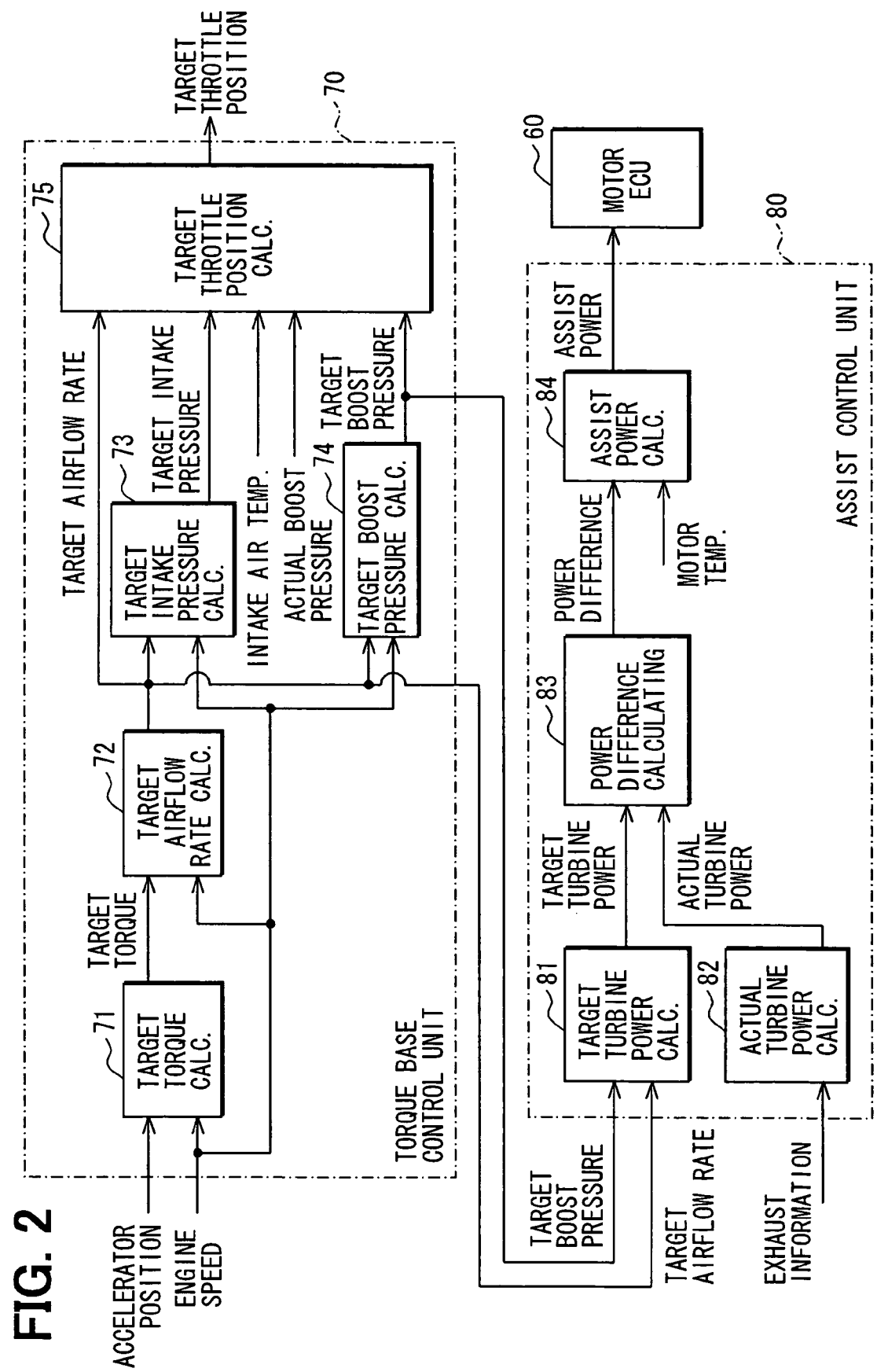
FIG. 2 is a control block diagram illustrating functions of an engine ECU.

Next, the outline of the control of the engine ECU 50 in the embodiment will be described with reference to FIG. 2. FIG. 2 is a control block diagram illustrating the functions of the engine ECU 50.

The system shown in FIG. 2 has, as main functions, a torque base control unit 70 for calculating a target throttle position on the basis of the target torque requested by the driver and an assist control unit 80 for calculating the assist power of the motor 34, to be instructed to the motor ECU 60. The details of the control units 70 and 80 will be described below.

In the torque base control unit 70, a target torque calculating unit 71 calculates a target torque on the basis of the accelerator position and the engine speed, and a target airflow rate calculating unit 72 calculates a target airflow rate on the basis of the target torque and the engine speed. The target airflow rate corresponds to an airflow rate required to realize the target torque requested by the driver. A target intake pressure calculating unit 73 calculates a target intake pressure (target pressure on the throttle downstream side) on the basis of the target airflow rate and the engine speed, and a target boost pressure calculating unit 74 calculates a target boost pressure (target pressure on the throttle upstream side) on the basis of the target airflow rate and the engine speed. A target throttle position calculating unit 75 calculates a target throttle position on the basis of the target airflow rate, target intake pressure, target boost pressure, an actual boost pressure, and a throttle passed intake temperature. In this case, a target airflow rate [g/rev] is used for calculating the target intake pressure and the target boost pressure. For calculation of the target throttle position, a target airflow rate [g/sec] per unit time obtained by converting the target airflow rate [g/rev] by using the engine speed is used.

The actual boost pressure is a boost pressure (throttle upstream pressure) detected by the boost pressure sensor 12, and the throttle passed intake temperature is an intake temperature on the throttle upstream side detected by the intake temperature sensor 13.

In this case, a target throttle position is calculated on the basis of the following basic equation for calculating a throttle passed airflow rate Ga.

$$Ga = f(Thr) \times Pb/\sqrt{T} \times f(Pm/Pb)$$

In the above equation, Thr denotes throttle position, Pb denotes throttle upstream pressure, Pm denotes throttle downstream pressure, and T indicates intake air temperature. In the embodiment, the throttle passed airflow rate Ga, the throttle position Thr, the throttle upstream pressure Pb, and the throttle downstream pressure Pm in the basic equation are replaced with a target airflow rate, a target throttle position, an actual boost pressure, and a target intake pressure, respectively. The target throttle position is calculated on the basis of the target airflow rate, actual boost pressure, target intake air pressure, and the like.

On the other hand, in the assist control unit 80, a target turbine power calculating unit 81 calculates target turbine power on the basis of the target airflow rate and the target boost pressure calculated in the torque base control unit 70. An actual turbine power calculating unit 82 calculates actual turbine power on the basis of exhaust information. A power difference calculating unit 83 calculates the power difference between the target turbine power and the actual turbine power. An assist power calculating unit 84 calculates assist power on the basis of the calculated power difference and outputs the assist power to the motor ECU 60.

In such a case, the assist power of the motor 34 is calculated as an insufficient amount of the actual turbine power for the target turbine power. That is, the turbine power insufficient amount is compensated by the motor assist. The assist control unit 80 also calculates a motor assist amount by using power as a unification parameter. Since an instruction value of the motor ECU 60 of an existing electric turbo system is a motor output, it is desirable to calculate the motor assist amount in power.

At the time of calculating the assist power, it is desirable to correct the assist power and set an upper limit guard on the basis of the performance and the operation state of the motor 34, the engine operating state, and the like. In the embodiment, the upper limit value of the assist power is set by using the motor temperature (the detection value of the temperature sensor 35) as a parameter and, by the upper limit value, the upper limit of the assist power is guarded.

The outline of the assist control of the electric turbocharger will be described with reference to FIGS. 3A to 3D.

Figure 3A:
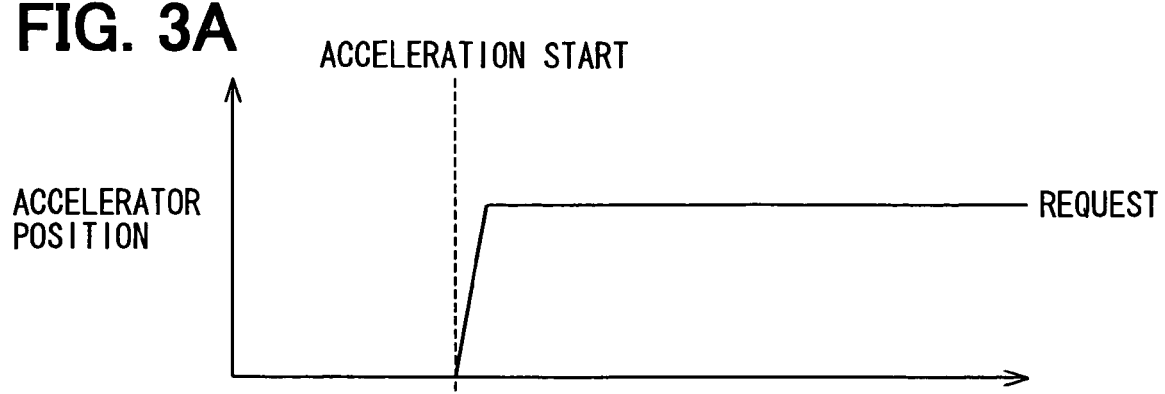
FIGS. 3A to 3D are time charts showing an outline of assist control of an electric turbocharger.
Figure 3B:
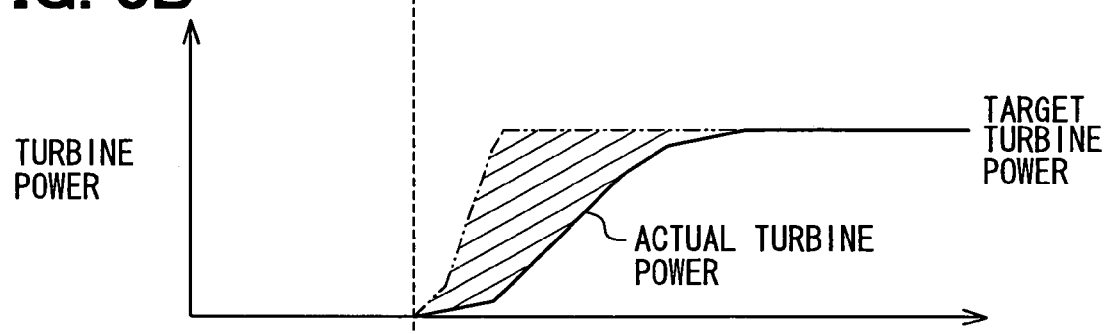
Figure 3C:
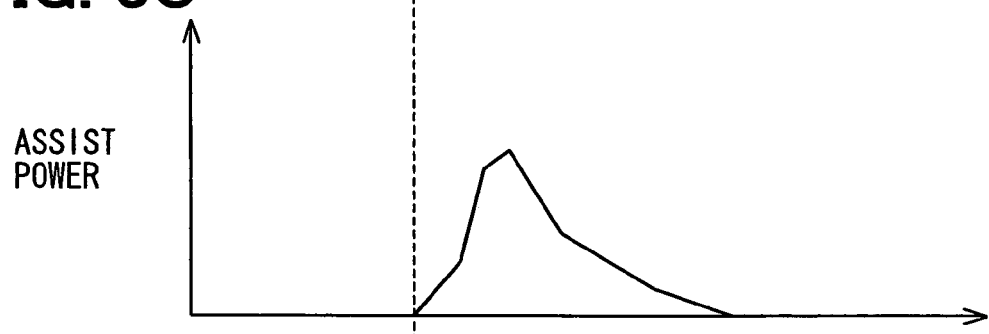
Figure 3D:
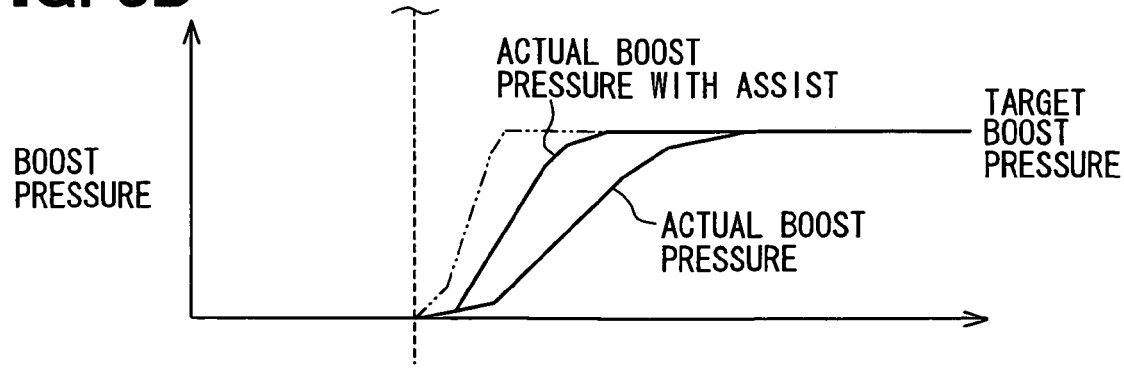

When the accelerator position changes and acceleration starts as shown in FIG. 3A, the target turbine power increases in accordance with an acceleration request and the actual turbine power (exhaust power) rises after the target turbine power as shown in FIG. 3B. Consequently, as shown in FIG. 3D, the actual boost pressure rises behind the target boost pressure. In the embodiment, when the turbine power is insufficient, the assist power is added as shown in FIG. 3C to assist the turbine power. At this time, the assist power is calculated on the basis of the difference between the target turbine power and the actual turbine power (the details will be described later). That is, in this case, the assist power by the motor 34 is added to the power (actual turbine power) of rotating the turbine wheel 32 by exhaust. By the sum of the powers (actual turbine power+assist power), the compressor impeller 31 is rotated via the shaft 33. As a result, the boost pressure is increased early as shown in FIG. 3D.

Figure 4:
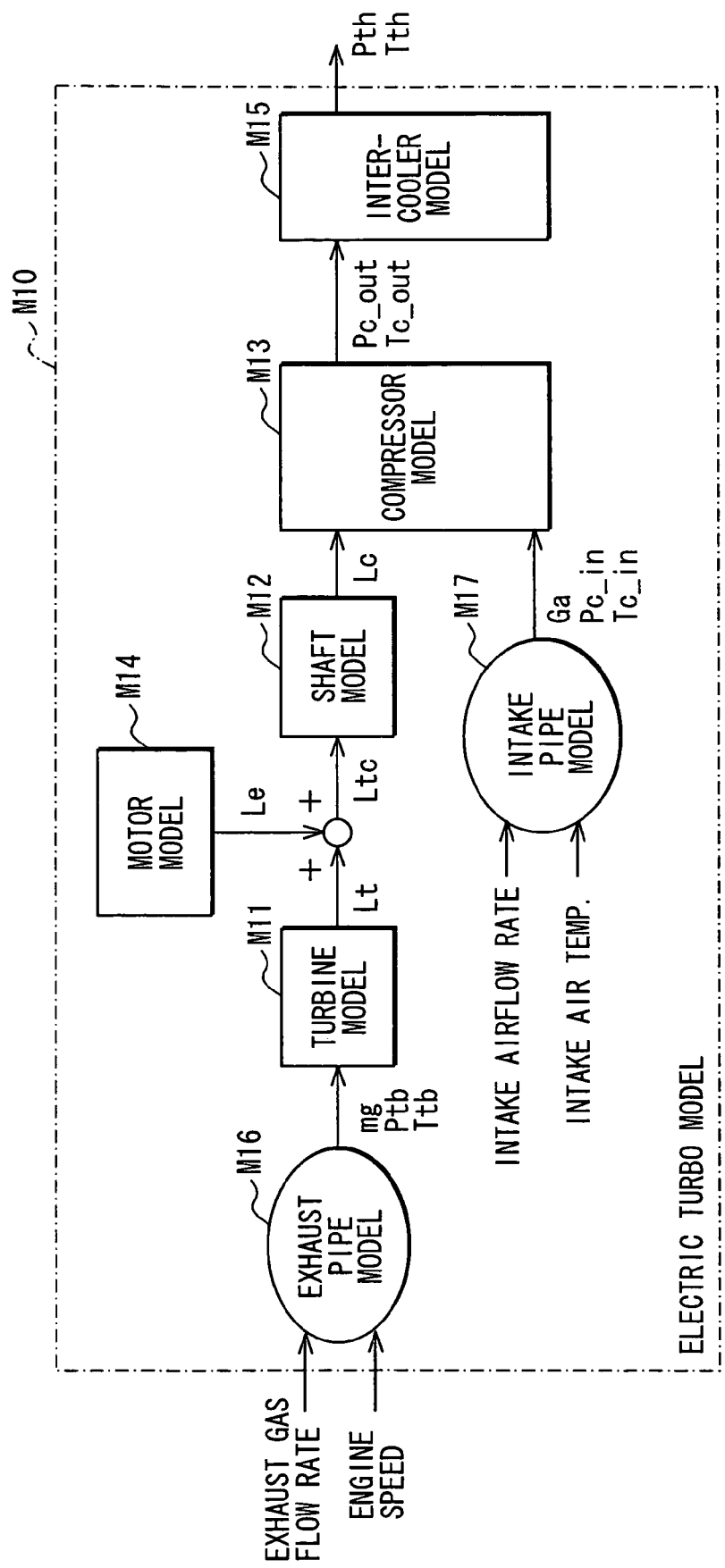
FIG. 4 is a control block diagram showing an electric turbo model.

In the embodiment, the turbine powers (target turbine power and actual turbine power) are calculated in the assist control unit 80 by using an electric turbo model. The details will be described below. FIG. 4 is a control block diagram showing an electric turbo model M10. In FIG. 4, the electric turbo model includes the motor 34 and the inter-cooler 37 provided with the turbocharger 30.

In FIG. 4, the turbine wheel 32, shaft 33, compressor impeller 31, motor 34, and inter-cooler 37 are modeled as a turbine model M11, a shaft model M12, a compressor model M13, a motor model M14, and an inter-cooler model M15, respectively. In addition to the parts models of the turbocharger, an exhaust pipe model M16 in which delay in exhaust and the like is considered, and an intake pipe model M17 in which delay in intake and the like is considered are provided.

In the electric turbo model M10, the turbo model M11, the shaft model M12, the compressor model M13, and the motor model M14 are configured by using the flow of energy (power) as a unification parameter on the basis of the principle of supercharging, thereby increasing the convenience (reusability) at the time of reusing the models. In other words, the model once configured can be easily applied to other systems. By using the models as the base, modeling of a supercharger having high redundancy and electronized can be also easily performed, and a model with high general versatility can be realized.

In the turbine model M11, turbine power Lt is calculated by using Equation (1) from exhaust parameters (exhaust flow rate mg, turbine upstream pressure Ptb_in, turbine downstream pressure Ptb_out, turbine upstream temperature Ttb_in, and turbine adiabatic efficiency ηg) of the engine 10 calculated in the exhaust pipe model M16.

$$L_t = c_g T_{tb\_in} \left\{ 1 - \left( \frac{P_{tb\_in}}{P_{tb\_out}} \right)^{\frac{\kappa_g - 1}{\kappa_g}} \right\} m_g \eta_g \qquad (1)$$

where cg denotes specific heat of exhaust, and κg denotes ratio of the specific heat.

The temperature, pressure, and flow rate as the exhaust parameters of the engine 10 may be actual measurement values of sensors or the like or estimated values by using models or maps. As an example, in the embodiment, the exhaust flow rate mg is calculated from an actual measurement value of the air flow meter 41 and an injection signal (or air fuel ratio), and the turbine upstream/downstream pressures Ptb and the turbine upstream/downstream temperatures Ttb are calculated from the exhaust flow rate mg by using a table which is preliminarily generated.

In an actual turbo system, many delay elements exist. For example, in the configuration of calculating the exhaust flow rate mg on the basis of the actual measurement value of the air flow meter 41, a delay occurs in reflection of the measured intake airflow rate into the exhaust flow rate in the turbine. Consequently, in the exhaust pipe model M16, the exhaust flow rate mg is calculated in consideration of delay elements and the like caused in the volume of the exhaust pipe 24 (the exhaust pipe volume from the export port to the turbine), pressure, and engine speed.

In the motor model M14, an assist power Le is calculated. A power Ltc obtained by adding the turbine power Lt calculated in the turbine model M11 and the assist power Le calculated in the motor model M14 is input to the shaft model M12 at the next stage.

In the shaft model M12, the power Ltc is converted to compressor power Lc by Equation (2) and the compressor power Lc is output. ηt denotes power conversion efficiency.

$$L_c = \eta_t L_{tc} \qquad (2)$$

The compressor power Lc derived by Equation (2) is input to the compressor model M13.

In the compressor model M13, boost pressure energy is calculated from the compressor power Lc and compressor efficiency ηc (Equation (3)). By modifying Equation (3), Equation (4) is obtained. By Equation (4), a compressor downstream pressure (compressor output pressure) Pc_out is calculated by using the boost pressure energy calculation value and intake parameters (intake airflow rate Ga, compressor upstream pressure (compressor input pressure) Pc_in, and intake air temperature Tc_in). In Equation (4), ca denotes the specific heat of intake air, and κa denotes the ratio of specific heat. The intake airflow rate Ga is calculated from a detection signal of the air flow meter 41. The compressor upstream pressure Pc_in is calculated from a detection signal of the atmospheric pressure sensor 44. The intake air temperature Tc_in is calculated from a detection signal of an intake air temperature sensor (for example, a temperature sensor attached to the air flow meter).

$$L_c\eta_c = c_a T_{c\_in}\left\{\left(\frac{P_{c\_out}}{P_{c\_in}}\right)^{\frac{\kappa_a-1}{\kappa_a}} - 1\right\}G_a \quad (3)$$

$$P_{c\_out} = P_{c\_in}\left(1 + \frac{L_c\eta_c}{c_a T_{c\_in} G_a}\right)^{\frac{\kappa_a}{\kappa_a-1}} \quad (4)$$

The airflow rate and pressure as intake air parameters of the engine 10 are calculated as values in which transport delay and the like caused by volume of the intake pipe 11 (volume of the intake pipe extending from the compressor to the throttle), pressure, and the like in the intake pipe model M17 are considered.

Each of the efficiencies used in Equations (1) to (3) is obtained from a table of input and power (energy) or by calculation. The efficiencies $\eta g$ and $\eta c$ can be computed by using adiabatic efficiency obtained from temperature and pressure. An efficiency $\eta t$ (see Equation (2)) of power conversion from the power Ltc to the compressor power Lc is determined by obtaining each adiabatic efficiency and, after that, at the time of identifying a model, obtaining Lc/Ltc from energy actually necessary for supercharging and the power Ltc at that time. By using an inverse-model method, a model can be generated without knowledge of conversion efficiency (machine efficiency or the like) of an actual turbo charger, and a stationary value of an actual machine can be reproduced by a model.

The compressor efficiency $\eta c$ is expressed as Equation (5).

$$\eta_c = \frac{T_{c\_in}\left\{\left(\frac{P_{c\_out}}{P_{c\_in}}\right)^{\frac{\kappa-1}{\kappa}} - 1\right\}}{T_{c\_out} - T_{c\_in}} \quad (5)$$

Equation (5) can be modified as the following equation (6). When the compressor efficiency $\eta c$, compressor upstream pressure Pc_in, compressor downstream pressure Pc_out, and intake air temperature Tc_in are known, the compressor downstream temperature Tc_out can be calculated from Equation (6).

$$T_{c\_out} = T_{c\_in} + \frac{T_{c\_in}}{\eta_c}\left\{\left(\frac{P_{c\_out}}{P_{c\_in}}\right)^{\frac{\kappa-1}{\kappa}} - 1\right\} \quad (6)$$

By the above flow, the compressor downstream pressure Pc_out and the compressor downstream temperature Tc_out are calculated and are input to the inter-cooler model M15 at the next stage.

Figure 5:
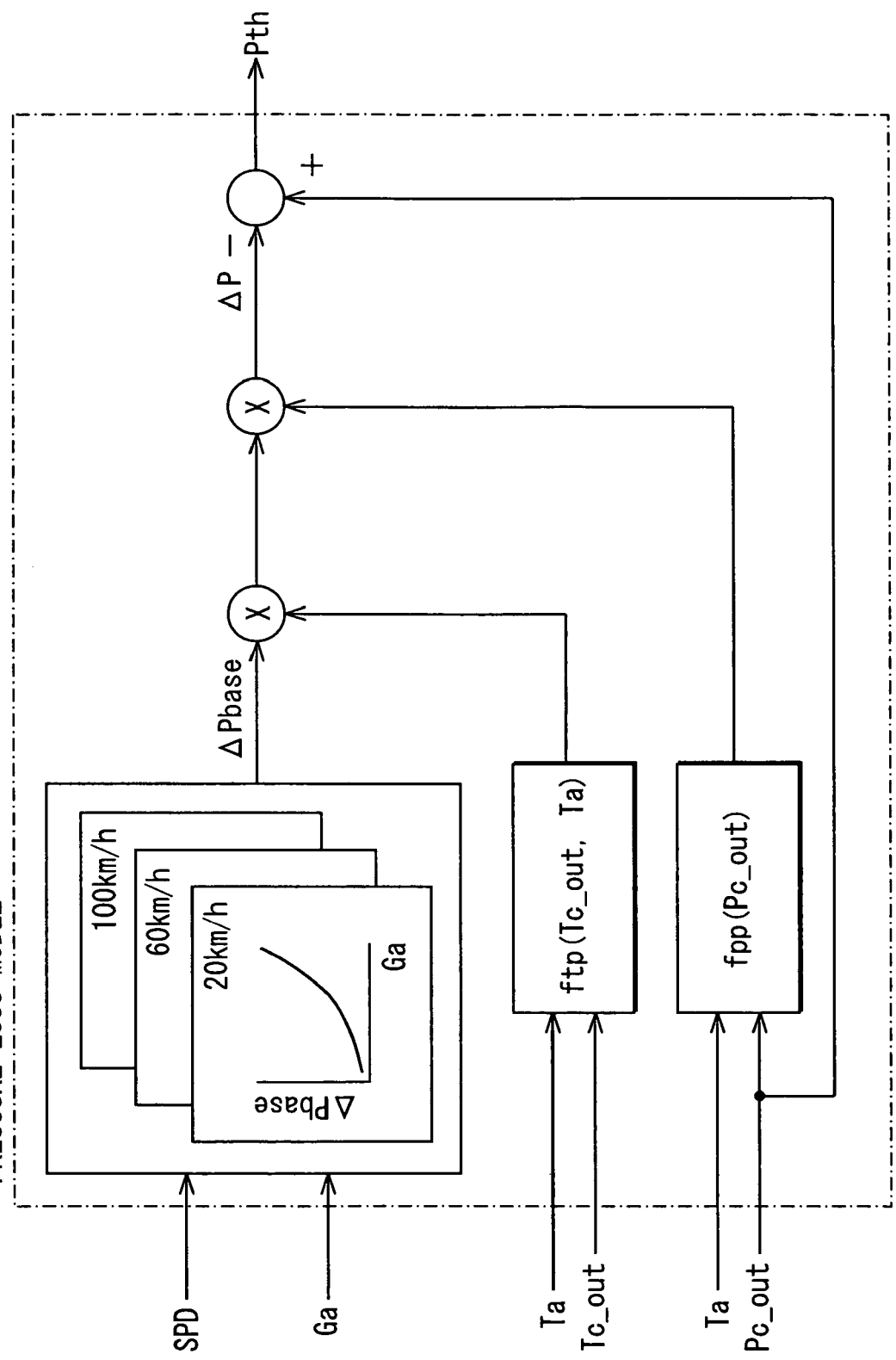
FIG. 5 is a diagram showing a pressure loss model of an inter-cooler model.
Figure 6:
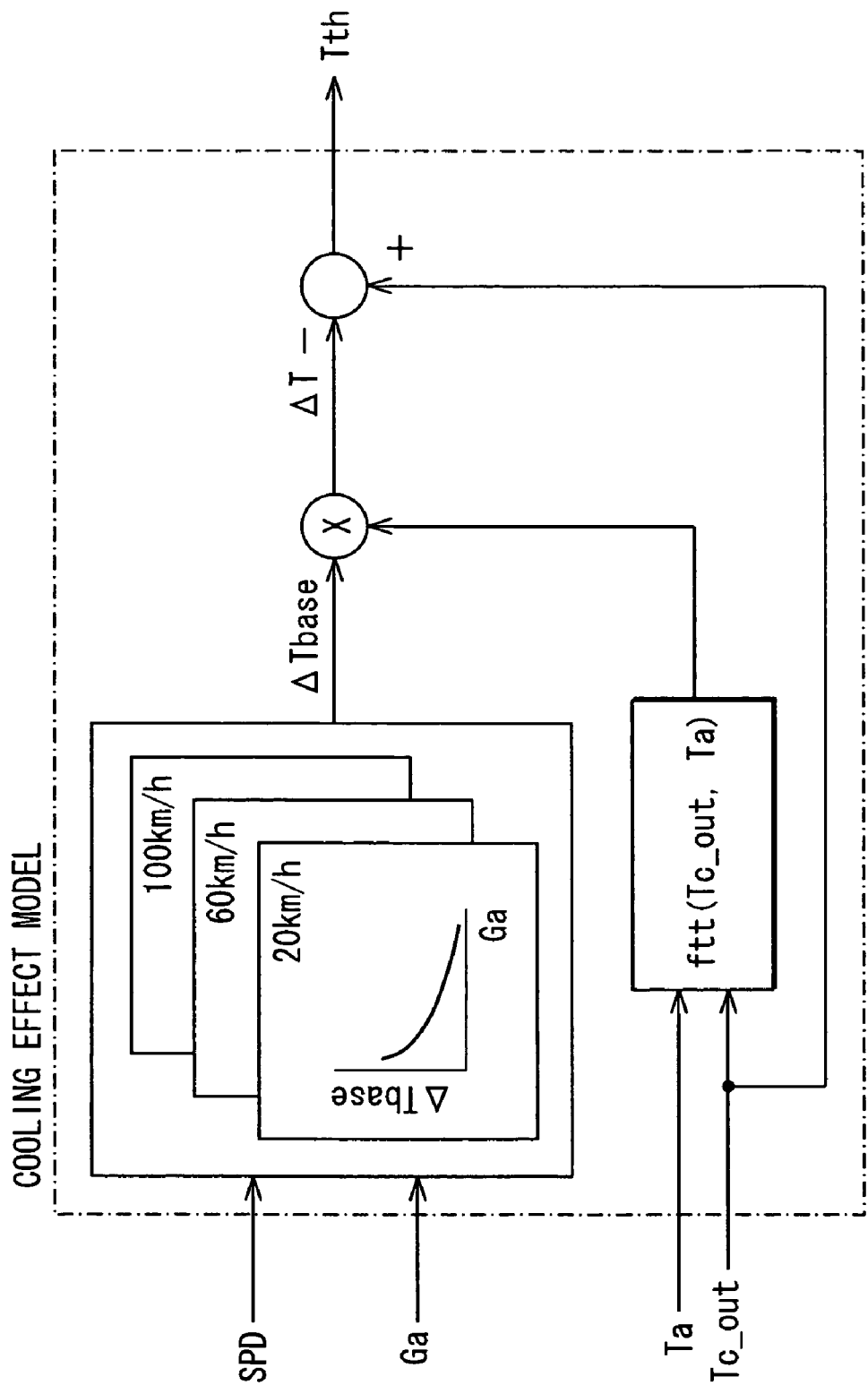
FIG. 6 is a diagram showing a cooling effect model of the inter-cooler model.

The inter-cooler model M15 is divided in a pressure loss model part for calculating pressure loss in the inter-cooler 37 and a cooling effect model part for calculating a cooling effect (temperature drop). The configuration of the former part is shown in FIG. 5. The configuration of the latter part is shown in FIG. 6. The pressure loss and the cooling effect are configured on the basis of the unit characteristic of the inter-cooler. The unit characteristic is specified as follows.

First, outside air temperature Ta_base, atmospheric air pressure Pa_base, compressor downstream pressure Pb_base, and compressor downstream temperature Tb_base as references are determined. The values are arbitrarily-determined reference operational condition values in an engine with a turbocharger to configure a model. Under the reference operational conditions, pressure loss $\Delta P$ as a pressure loss characteristic and a temperature drop amount $\Delta T$ as a cooling effect characteristic (temperature drop characteristic) with respect to an inter-cooler inflow rate are obtained. The pressure loss $\Delta P$ is the difference between an input pressure and an output pressure of the intercooler. The temperature drop amount $\Delta T$ is the difference between an input temperature and an output temperature of the inter-cooler. This is a reference model.

The pressure loss and the cooling effect in the inter-cooler 37 change with parameters of the input pressure of the inter-cooler (compressor downstream pressure Pc_out), temperature (compressor downstream temperature Tc_out), outside air temperature Ta, and speed of wind passing through the inter-cooler 37 (that is, vehicle speed). Consequently, on the basis of each of the parameters, the calculation value is corrected under the reference conditions In this case, the pressure loss decreases with increase in the compressor downstream pressure Pc_out and rise in the compressor downstream temperature Tc_out, or increase in the wind speed. The cooling effect (temperature drop) increases with rise in the compressor downstream temperature Tc_out or increase in the wind speed.

In the pressure loss model shown in FIG. 5, with a characteristic map generated by setting the outside air temperature Ta_base, the compressor downstream temperature Pb_base, and the compressor downstream temperature Tb_base as reference values (for example, Ta_base=25° C., Pb_base=0 kPa, and Tb_base=75° C.), a reference pressure loss $\Delta$Pbase is calculated on the basis of the intake airflow rate Ga and the vehicle speed SPD at each time.

A compression correction factor is calculated on the basis of the compressor downstream pressure Pc_out by using Equation (7), and a temperature correction factor is calculated on the basis of the compressor downstream temperature Tc_out and the outside air temperature Ta by using Equation (8). $\rho(T)$ denotes density of air at an arbitrary temperature.

$$f_{pp}(P_{c\_out}) = \frac{P_{a\_base}}{P_a + P_{c\_out}} \quad (7)$$

$$f_{tp}(T_{c\_out}, T_a) = \frac{\rho(T_{b\_base} - T_{a\_base})}{\rho(T_{c\_out} - T_a)} \quad (8)$$

The temperature correction by Equation (8) is performed in consideration of the difference between the outside air temperature and supercharge temperature, and the temperature correction accompanying a change in the outside air temperature Ta is included in Equation (8) (temperature correction by Equation (10) which will be described later is similarly performed).

Subsequently, boost pressure Pth (throttle upstream pressure) is calculated by the following equation (9).

$$P_{th} = P_{c\_out} - \Delta P_{base} \times f_{tp}(T_{c\_out}, T_a) \times f_{pp}(P_{c\_out}) \quad (9)$$

In the cooling effect model shown FIG. 6, like the pressure loss model of FIG. 5, a reference temperature drop amount $\Delta$Tbase is calculated on the basis of the intake airflow rate Ga and the vehicle speed SPD at each time by using a characteristic map generated by setting the outside air temperature Ta_base, the compressor downstream pressure Pb_base, and the compressor downstream temperature Tb_base as reference values (for example, Ta_base=25° C., Pb_base=0 kPa, and Tb_base=75° C.).

By using Equation (10), a temperature correction factor is calculated on the basis of the compressor downstream temperature Tc_out and the outside air temperature Ta.

$$f_{tt}(T_{c\_out}, T_a) = \frac{T_{c\_out} - T_a}{T_{b\_base} - T_{a\_base}} \quad (10)$$

As described above, even when the compressor downstream pressure Pc_out changes, mass flow to the inter-cooler 37 does not change, so that the pressure correction for the cooling effect (temperature drop) is not performed.

By the equation (11), a supercharge temperature Tth (throttle upstream temperature) is calculated.

$$T_{th} = T_{c\_out} - \Delta T_{base} \times f_{tt}(T_{c\_out}, T_a) \quad (11)$$

The boost pressure Pth (throttle upstream pressure) and the supercharge temperature Tth (throttle upstream temperature) as outputs of the inter-cooler model M15 are calculated.

Figure 7:
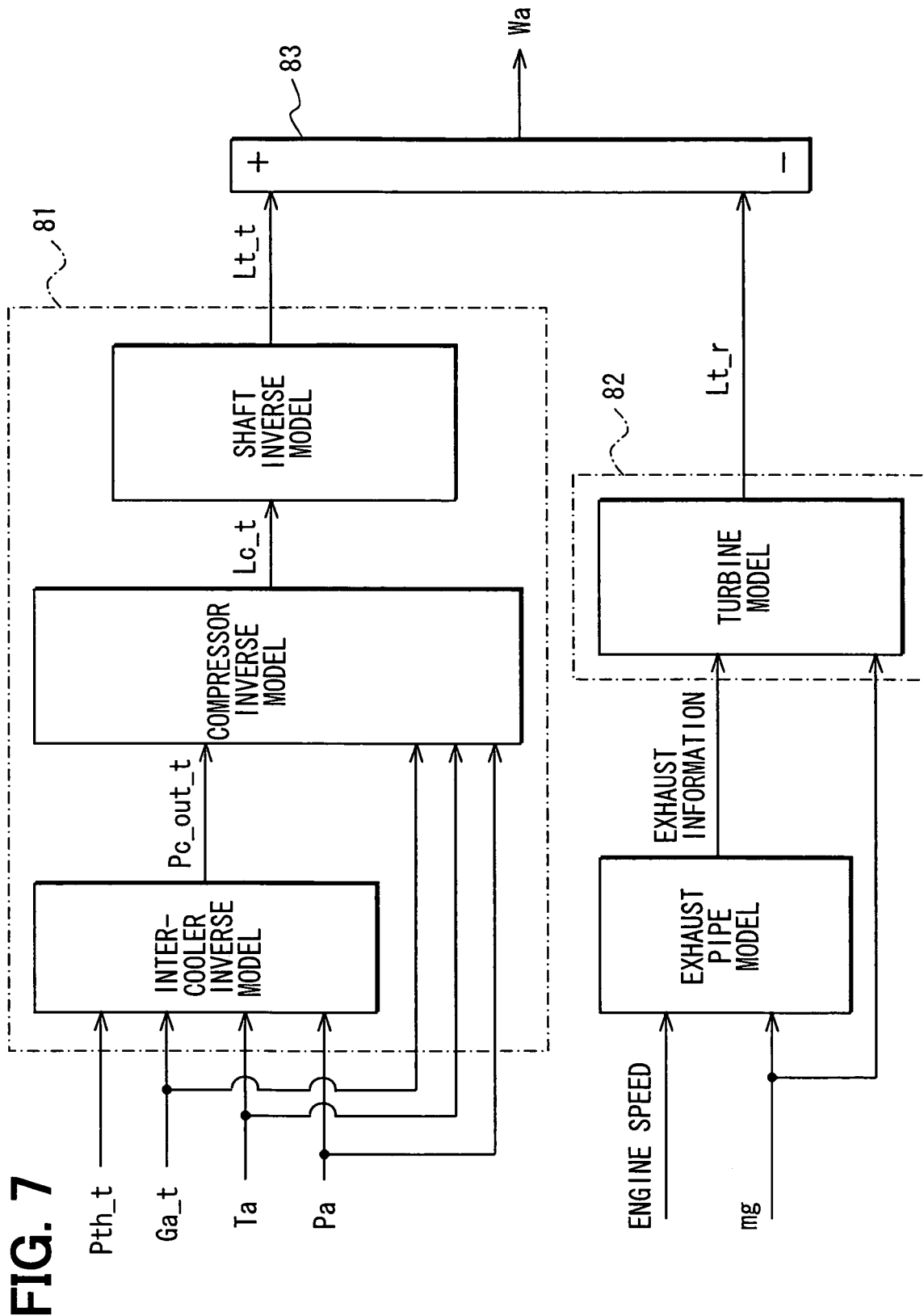
FIG. 7 is a control block diagram showing the details of a target turbine power calculating unit and an actual turbine power calculating unit in an assist control unit.

The target turbine power calculating unit 81 and the actual turbine power calculating unit 82 in the assist control unit 80 of FIG. 2 are configured on the basis of the electric turbo model M10, and the outline of the units 81 and 82 is shown as a control block diagram of FIG. 7. The target turbine power calculating unit 81 calculates a target turbine power Lt_t by inverse calculation (inverse model) of the electric turbo model M10, and the actual turbine power calculating unit 82 calculates an actual turbine power Lt_r by forward calculation (forward model) of the electric turbo model M10. The target turbine power Lt_t corresponds to an input of the shaft model M12 in FIG. 4 and is actually the sum of the turbine power and the assist power (that is, the target power of the turbocharger 30).

Figure 8:
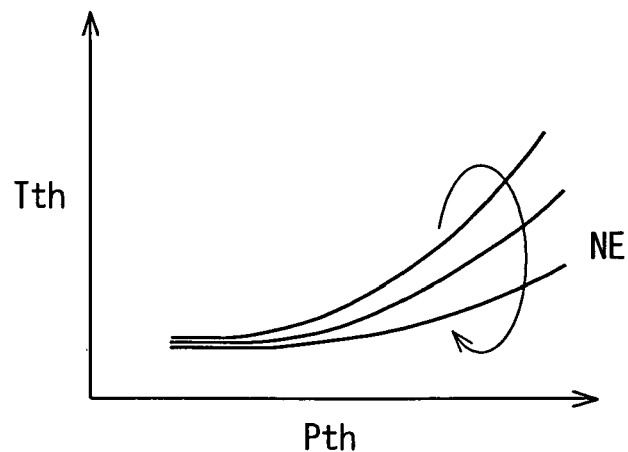
FIG. 8 is a diagram showing the relation between boost pressure and supercharge temperature.

In short, the target turbine power calculating unit 81 calculates the target turbine power Lt_t by setting the target boost pressure Pth_t (target throttle upstream pressure) and the target airflow rate Ga_t as main computation parameters by using inverse models of the shaft model M12, compressor model M13, and inter-cooler model M15 in FIG. 4. In this case, specifically, in the inter-cooler inverse model, by using a map (FIG. 8) based on actual machine data, the target supercharge temperature Tth_t is calculated on the basis of the target boost pressure Pth_t. By making a back calculation expression with the inverse model (the inter-cooler pressure loss model) of FIG. 5 and the inverse model (the cooling effect model) of FIG. 6, a target compressor downstream pressure Pc_out_t is calculated on the basis of the target boost pressure Pth_t (target throttle upstream pressure) and the target supercharge temperature Tth_t (target throttle upstream temperature), in addition, the target airflow rate Ga_t, the outside air temperature Ta (compressor upstream temperature), and the atmospheric pressure Pa (compressor upstream pressure).

In the inverse model of the compressor, a target supercharge energy Wc_t is calculated by using the following equation (12) from the target compressor downstream pressure Pc_out_t, target airflow rate Ga_t, outside air temperature Ta, and atmospheric air pressure Pa. In the equation, ca denotes specific heat of air, and κa denotes the ratio of specific heat of air.

$$W_{c\_t} = c_a T_a \left\{ \left( \frac{P_{c\_out\_t}}{P_a} \right)^{\frac{\kappa_a - 1}{\kappa_a}} - 1 \right\} G_{a\_t} \quad (12)$$

Figure 9:
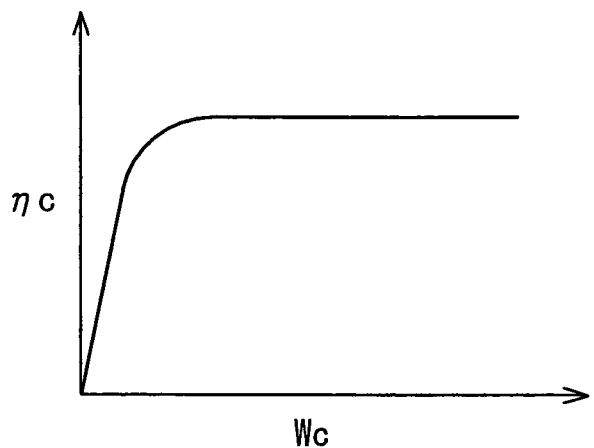
FIG. 9 is a diagram showing the relation between supercharging energy and compressor efficiency.

Further, compressor efficiency ηc_t is calculated from the efficiency map shown in FIG. 9 using the target supercharge energy Wc_t as a parameter and the target compressor power Lc_t is calculated by the following equation (13).

$$L_{c\_t} = W_{c\_t} / \eta_{c\_t} \quad (13)$$

In the inversion model of the shaft, the target compressor power Lc_t is converted to a target turbine power Lt_t by using the following equation 14. ηt denotes power conversion efficiency.

$$L_{t\_t} = L_{c\_t} / \eta_t \quad (14)$$

In the target turbine power calculating unit 81, a turbine inertia inversion model (an inversion model of the first order lag of inertia of the turbine) may be added. By addition of the turbine inertia inversion model, improvement in calculation precision of the target turbine power can be realized.

The actual turbine calculating unit 82 calculates the actual turbine power Lt_r by exhaust via an exhaust pipe model and a turbine model (forward model) in a manner similar to the calculation order of the turbo model. Specifically, the actual turbine power Lt_r is calculated by using the equation (1) from the exhaust parameters (exhaust flow rate mg, turbine upstream pressure Ptb_in, turbine downstream pressure Ptb_out, turbine upstream temperature Ttb_in, and turbine adiabatic efficiency ηg) of the engine 10 calculated by the exhaust pipe model.

The power difference calculating unit 83 calculates the power difference (=Lt_t−Lt_r) between the target turbine power Lt_t and the actual turbine power Lt_r calculated as described above and, from the power difference, calculates a request assist power Wa. An upper limit guard or the like is properly set for the request assist power Wa. After that, an assist power signal (motor instruction value) is output to the motor ECU 60.

Figure 10:
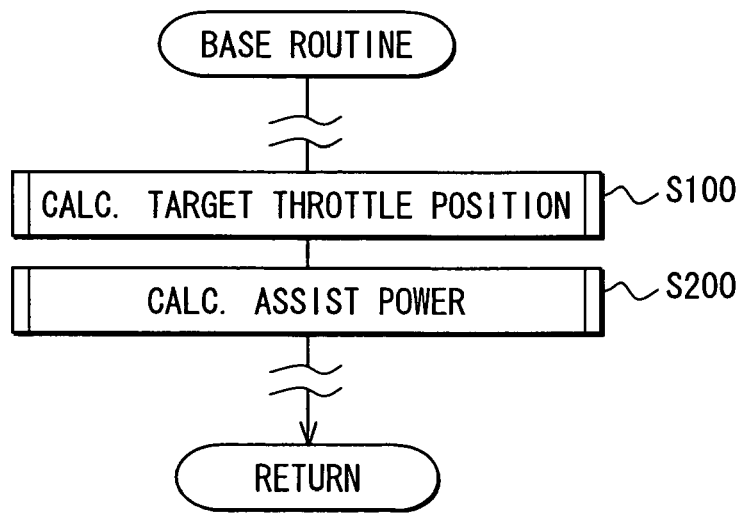
FIG. 10 is a flowchart showing a base routine performed by the engine ECU.

Next, the flow of process of calculating the target throttle position and the assist power by the engine ECU 50 will now be described with reference to the flowcharts of FIGS. 10 to 15. FIG. 10 is a flowchart showing a base routine. The routine is executed, for example, every 4 msec by the engine ECU 50. In the base routine of FIG. 10, sub routines of FIGS. 11 to 15 are properly executed. The flow of the processes described below is basically according to the control block diagram of FIG. 2 and repetitive description will be partly omitted.

Figure 11:
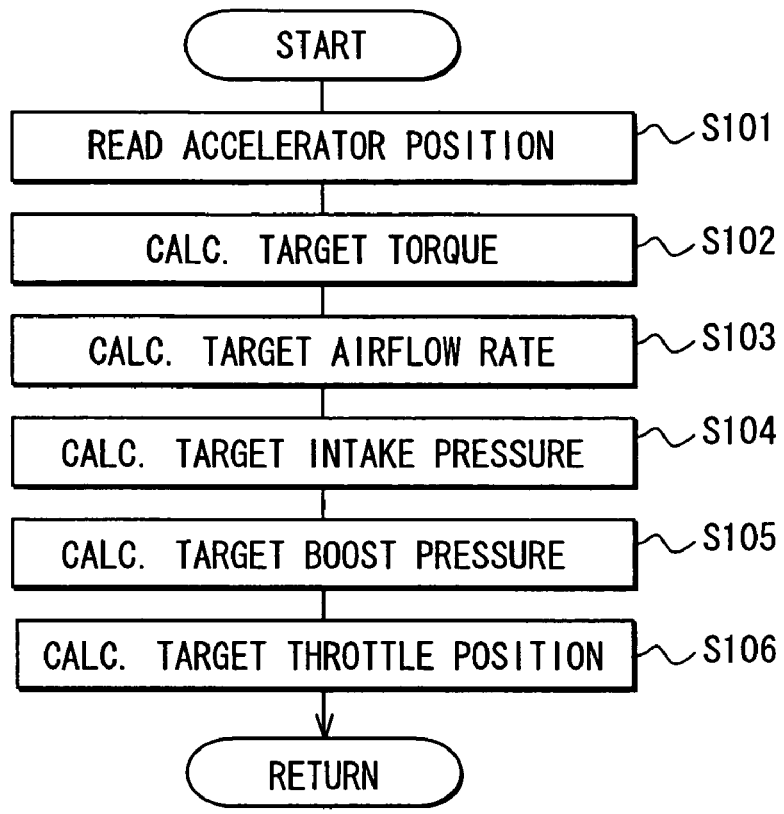
FIG. 11 is a flowchart showing a target throttle position calculating routine.
Figure 12:
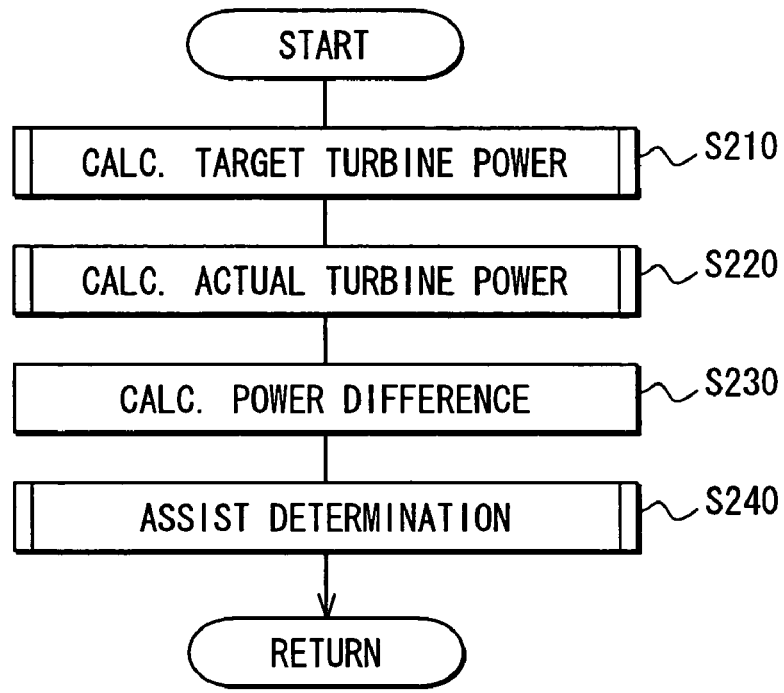
FIG. 12 is a flowchart showing an assist power calculating routine.

As shown in FIG. 10, the base routine includes a target throttle position calculating routine (step S100) and an assist power calculating routine (step S200). FIG. 11 shows the details of the target throttle position calculating routine, and FIG. 12 shows the details of the assist power calculating routine.

In the target throttle position calculating routine shown in FIG. 11, first, an accelerator position detection value is read (step S101). Next, a target torque is calculated on the basis of the accelerator position and the engine speed (step S102). A target airflow rate is calculated on the basis of the target torque and the engine speed (step S103), and a target intake air pressure (target throttle downstream pressure) and a target boost pressure (target throttle upstream pressure) are calculated on the basis of the target airflow rate and the engine speed (steps S104 and S105). Finally, a target throttle position is calculated on the basis of the target airflow rate, target intake air pressure, target boost pressure, actual boost pressure, and throttle passed intake air temperature (step S106).

In the assist power calculating routine shown in FIG. 12, first, by using the subroutine of FIG. 13 which will be described later, the target turbine power is calculated on the basis of the inverse model of the turbo model (step S210). Next, by using the subroutine of FIG. 14 which will be described later, an actual turbine power is calculated on the basis of the forward model of the turbo model (step S220). By subtracting the actual turbine power from the target turbine power, the power difference is calculated (step S230). By using the subroutine of FIG. 15 which will be described later, whether the power assist can be performed or not is determined (step S240).

Figure 13:
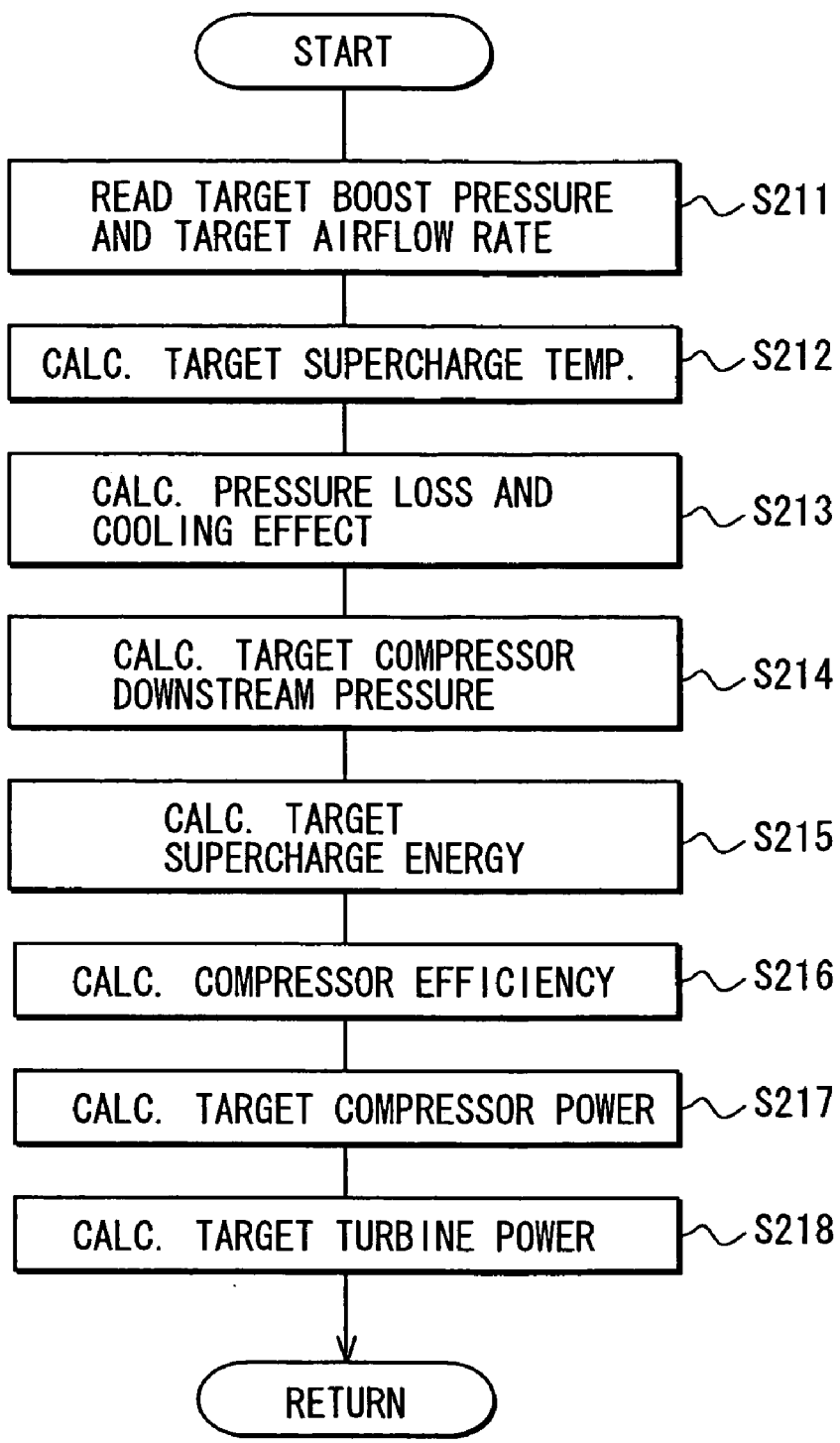
FIG. 13 is a flowchart showing a target turbine power calculating routine.

In the target turbine power calculating subroutine shown in FIG. 13, the target boost pressure and the target airflow rate are read (step S211). Subsequently, for example, by using the relation of FIG. 8, the target supercharge temperature is calculated on the basis of the target boost pressure (step S212). After that, by using the inverse model of the inter-cooler, the target compressor downstream pressure is calculated while considering the pressure loss and the cooling effect in the inter-cooler (steps S213 and S214). The target supercharge energy is calculated by using the inverse model of the compressor, and the compressor efficiency is calculated by using, for example, the relation of FIG. 9 (steps S215 and S216). The target compressor power is calculated from the target supercharge energy and the compressor efficiency (step S217) and, further, the target turbine power is calculated by using the inverse model of the shaft (step S218).

Figure 14:
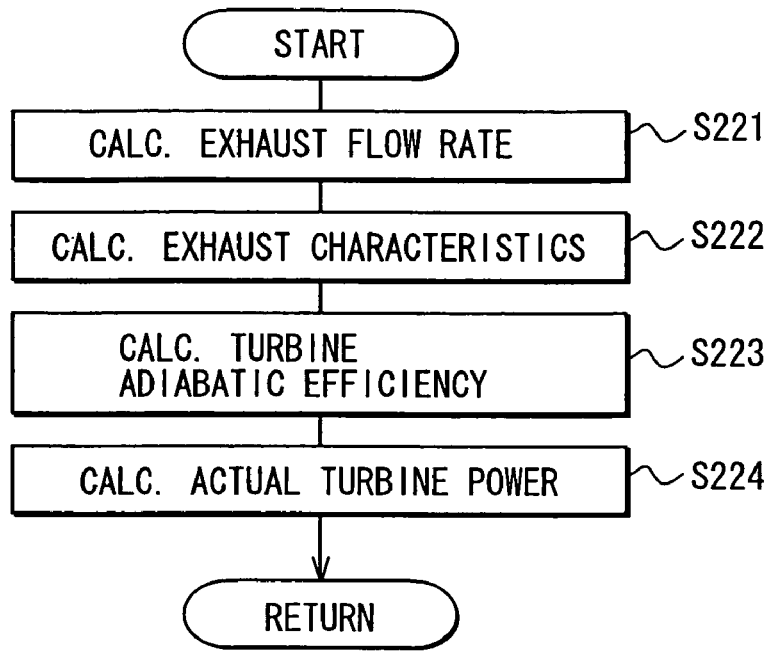
FIG. 14 is a flowchart showing an actual turbine power calculating routine.

The actual turbine power calculating subroutine shown in FIG. 14 is constructed by an exhaust pipe model part and a turbine model part. In the exhaust pipe model part, the exhaust flow rate is calculated in consideration of a delay which occurs in reflection of an airflow rate measured by the air flow meter 41 as the exhaust flow rate in the turbine (step S221). On the basis of the exhaust flow rate, exhaust characteristics (pressures and temperatures on the upstream/downstream sides of the turbine) are calculated (step S222). The turbine model part calculates the turbine adiabatic efficiency ηg (step S223) and calculates the actual turbine power on the basis of the exhaust parameters such as the exhaust flow rate, exhaust pressure, and exhaust temperature and the turbine adiabatic efficiency ηg (step S224).

Figure 15:
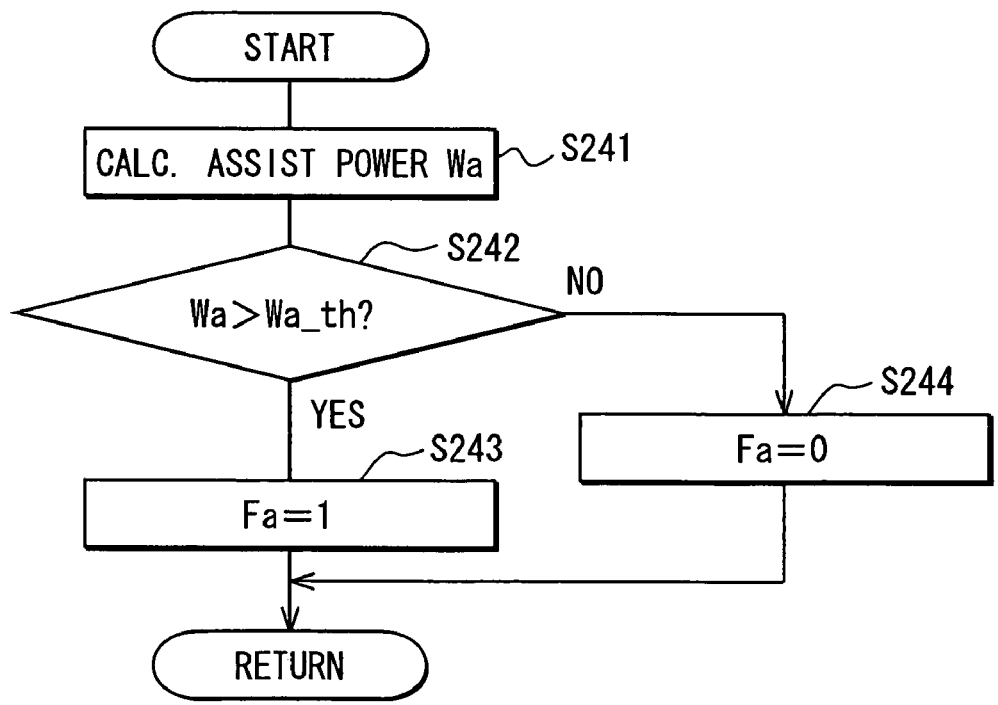
FIG. 15 is a flowchart showing an assist determination routine.

Next, in the assist determining routine shown in FIG. 15, the assist power Wa is calculated on the basis of the power difference calculated in step S230 in FIG. 12 (step S241). At this time, the upper limit guard based on the motor characteristics and the motor temperature is properly set, and the assist power Wa is calculated. After that, whether the assist power Wa is larger than a predetermined value Wa_th or not is determined (step S242). When Wa>Wa_th, 1 is set to an assist permit flag Fa. When Wa≦Wa_th, 0 is set for the assist permit flag Fa (steps S243 and S244). By the operation, in the case where Wa>Wa_th (the assist permit flag Fa=1), the power assist by the motor 34 is executed. In the case where Wa≦Wa_th (assist permit flag Fa=0), the power assist by the motor 34 is stopped.

FIGS. 16A to 16F are time charts showing various behaviors in the case of using the assist control in the embodiment. In FIGS. 16B to 16D and FIG. 16F, a conventional technique of applying an assist power on the basis of an acceleration request at the time of an acceleration request is also shown as an object to be compared. The behaviors of the conventional technique are shown by alternate long and dash lines.

When the accelerator position changes and acceleration starts as shown in FIG. 16A, target values of the torque and the boost pressure increase in accordance with an acceleration request as shown in FIGS. 16B and 16C. As shown in FIG. 16E, the target turbine power increases, and the actual turbine power rises after the target turbine power. In such a case, the power difference (the hatched part in FIG. 16E) between the target turbine power and the actual turbine power is calculated and is used as an assist power of the motor 34. By performing the assist control, the actual torque and boost pressure increase so as to trace target values, and improvement in acceleration is realized. After that, when the actual turbine increases sufficiently with respect to the target turbine power, the assist power is set to zero, and the power assist by the motor 34 is stopped. The throttle position is settled to a stationary value.

In this case, the throttle position is calculated from the pressure ratio between the target intake pressure and the actual boost pressure (=target intake pressure/actual boost pressure, corresponding to the ratio between the throttle downstream pressure and the throttle upstream pressure) and the target airflow rate. In the case where the actual boost pressure at the time of transition is lower than the stationary value, the pressure ratio becomes lower than the stationary value. Consequently, the throttle position is set to a large angle in order to compensate the insufficient amount of the boost pressure, thereby improving the acceleration performance (transition response). When the actual boost pressure becomes closer to the stationary value, the throttle position is automatically converged to the value in the stationary state.

In the conventional control, comparison between the target turbine power and the actual turbine power or the like is not performed, and the assist power is calculated on the basis of the accelerator position and the increase ratio. Consequently, the assist power almost interlocks with an acceleration request. Sufficient acceleration performance cannot be obtained by the assist power and, moreover, there is no means of decreasing the assist power in association with increase in the boost pressure, so that a state in which a substantially unnecessary assist power is given is continued. With respect to the throttle position, the opening speed is controlled but there is no control of improving acceleration performance by overshooting the throttle position as shown by the alternate long and dash line in FIG. 16D. The throttle position only interlocks with the accelerator position. Therefore, rise in the torque is slow as shown by the alternate long and dash line in FIG. 16B and sufficient improvement in the transition characteristics is not obtained. Moreover, there is also danger of overshoot of the boost pressure as shown by the alternate long and dash line in FIG. 16C.

By the embodiment described above in detail, the following excellent effects are obtained.

The assist power is calculated on the basis of the power difference between the target turbine power and the actual turbine power in the turbocharger 30, and the power assist of the motor 34 is controlled by the calculated assist power. Consequently, by using an insufficient amount for the target turbine power as an assist amount, wasteless, efficient assist control can be executed. Since the assist power is calculated by comparison of powers, assist control which is more direct and has higher response than that in the case of calculating the assist power by using other parameters such as boost pressure can be performed. Thus, the power assist by the motor 34 provided for the shaft 33 can be properly controlled and, moreover, fuel consumption, drivability, and the like can be improved.

Since the target turbine power is calculated on the basis of the target airflow rate used for torque control (airflow rate control) of the engine, the throttle valve 14 (airflow rate adjusting means) and the motor 34 (power assist device) are controlled interlockingly, and precision of the torque control improves. Therefore, excess and deficiency of the engine output and the like does not occur, and the drivability can be further improved.

By using the electric turbo model M10 as a physical model expressing the flow of power in the turbocharger 30, the target turbine power is calculated by the inverse model of the turbo model (inversion models of the inter-cooler, compressor, and shaft), and the actual turbine power is calculated by the forward model of the turbo model (forward model of the turbine). Thus, the target turbine power and the actual turbine power can be calculated with high precision, and the precision of the power assist control can be improved.

The present invention is not limited to the description of the foregoing embodiment and may be carried out as follows.

Although the target turbine power is calculated on the basis of the target boost pressure and the target airflow rate in the foregoing embodiment (refer to FIG. 2), it is also possible to use an actual airflow rate in place of the target airflow rate and calculate the target turbine power on the basis of the target boost pressure and the actual airflow rate. Specifically, in this case, in the control block diagram of FIG. 2, the target boost pressure and the actual airflow rate are input to the target turbine power calculating unit 81. The actual airflow rate is volume of air actually passed through the compressor impeller (actual compressor passed airflow rate) and may be calculated on the basis of the detection value of the air flow meter 41. Alternately, the actual airflow rate may be estimated on the basis of the engine operating conditions at each time by using a map preliminarily generated on the basis of adaptation or the like or may be estimated by using a model.

Figure 17A:
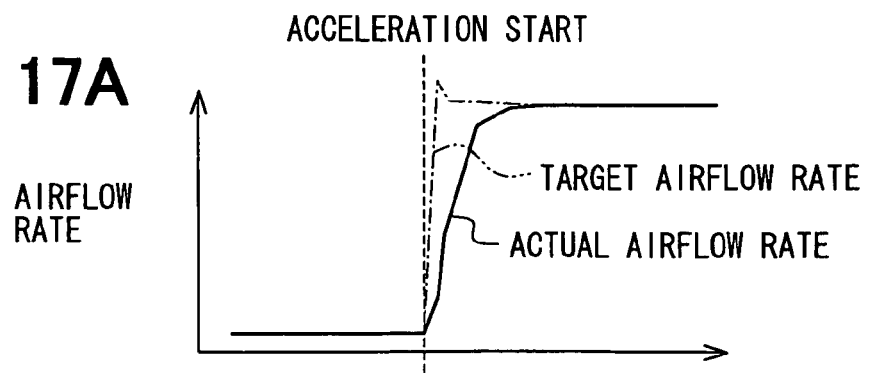
FIGS. 17A to 17D are time charts showing various behaviors at the time of assist control in another mode.
Figure 17B:
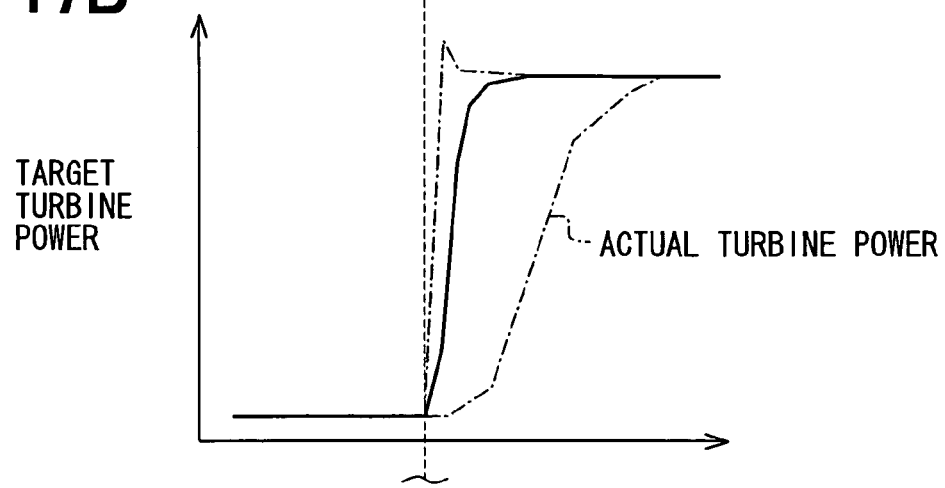
Figure 17C:
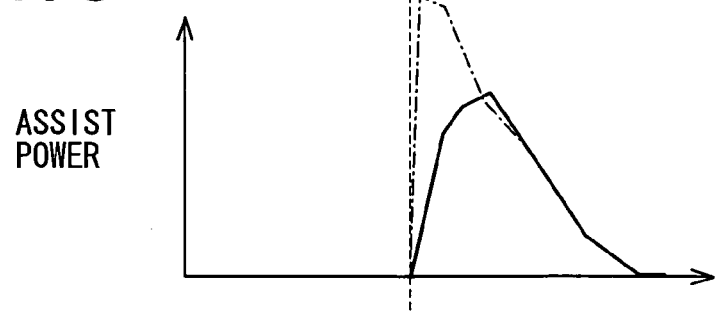
Figure 17D:
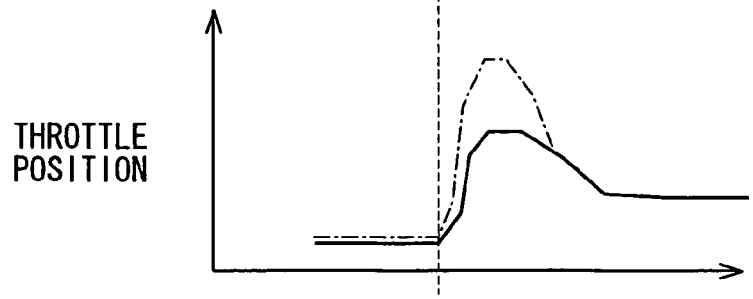

FIGS. 17A to 17D are time charts showing behaviors of control in the case of calculating the target turbine power by using the actual airflow rate. In FIGS. 17B to 17D, for comparison, the behaviors of the target turbine power, assist power, and throttle position (behaviors of control in the foregoing embodiment) in the case of using the target airflow rate are shown by alternate long and short dash lines.

As shown in FIG. 17A, change in the actual airflow rate lags behind change in the target airflow rate. Consequently, in the case of calculating the target turbine power on the basis of the actual airflow rate, as compared with the case of calculating the target turbine power on the basis of the target airflow rate, the power difference between the target turbine power and the actual turbine power is reduced (FIG. 17B). Therefore, the assist power decreases by the reduction amount, and the energy consumption at the time of power assist (consumption amount of battery power by driving of the motor) can be reduced. The reduction amount of the assist power is compensated by the airflow rate increase amount by the airflow rate control, and acceleration performance (supercharge characteristic) is assured.

In the embodiment, the power difference between the target turbine power and the actual turbine power of the turbo charger 30 is calculated and, on the basis of the power difference, a motor assist amount is calculated. The configuration may be changed to calculate the power difference between the target compressor power and the actual compressor power of the turbocharger 30 and, on the basis of the power difference, calculate the motor assist amount.

In the embodiment, the assist power is calculated as the assist amount of the motor 34 and the motor 34 is driven so as to realize the calculated assist power. Alternately, another configuration may be employed in which the turbine rotational speed is calculated as the assist amount and the driving of the motor 34 is controlled so as to realize the turbine rotational speed.

In the embodiment, calculation of the turbine powers (the target turbine power and the actual turbine power) in the assist control unit 80 is executed with the electric turbo model. The method may be changed to another method. For example, the target turbine power and the actual turbine power may be calculated by map computation.

Although the target boost pressure is calculated on the basis of the target airflow rate calculated from the target torque in the torque base control unit 70 (FIG. 2) in the embodiment, instead, the target boost pressure may be calculated directly from the target torque.

Although the actual boost pressure is obtained from the detection value of the boost pressure sensor 12 and the target throttle position is calculated by using the actual boost pressure in the embodiment, alternately, it is also possible to obtain an actual boost pressure by estimation and calculate the target throttle position by using the estimation value. Concretely, the turbo model described with reference to FIG. 4 is used and the boost pressure obtained as an output of the model is used as the estimation value of the actual boost pressure.

Second Embodiment

Figure 18:
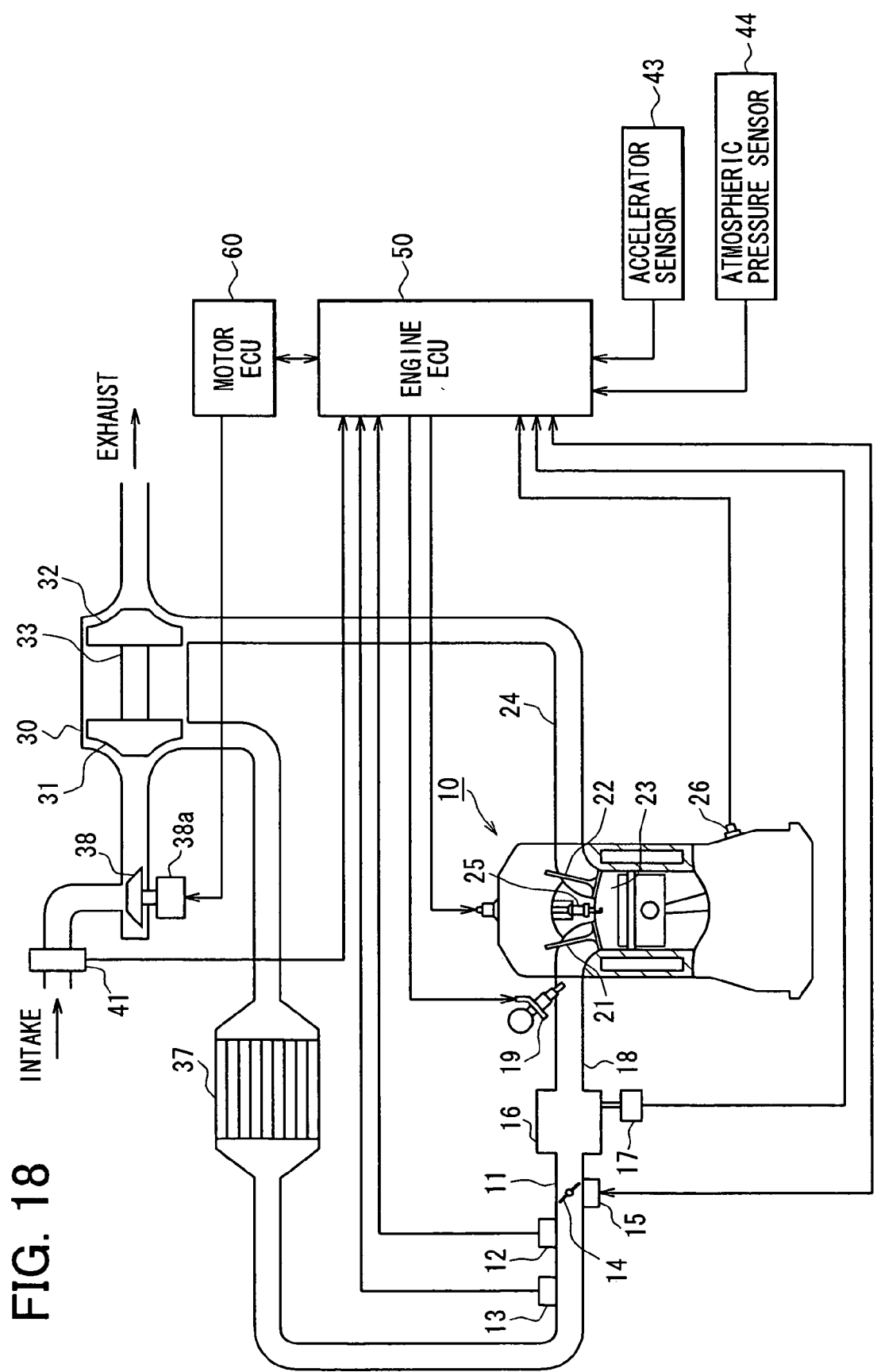
FIG. 18 is a diagram showing a schematic configuration of an engine control system in a second embodiment of the invention.

FIG. 18 is a general schematic configuration diagram of an engine control system. The same reference numerals are designated to the same components as those of the first embodiment and the description will not be repeated. The description of the same operations will not be also repeated.

In the intake pipe 11, an auxiliary electric compressor 38 is provided on the compressor upstream side of the turbocharger 30. By the auxiliary compressor 38, the intake air is compressed on the upstream side of the turbocharger 30. The auxiliary compressor 38 uses a motor 38a as a drive source. When the motor 38a is driven by power supply from a battery (not shown), the auxiliary compressor 38 operates. That is, different from the turbocharger 30, the auxiliary compressor 38 uses power other than exhaust as its power source.

The engine ECU 50 determines a control amount of the auxiliary compressor 38 (motor 38a) interlockingly with the torque base control. Consequently, when the vehicle accelerates, the assist power (auxiliary power) is given to the turbocharger 30 to obtain a desired boost pressure as promptly as possible. That is, the engine ECU 50 computes target assist power, target power assist timing, and the like on the basis of the target boost pressure calculated according to the target torque, and outputs the results of computation to the motor ECU 60. The motor ECU 60 receives signals from the engine ECU 50, performs a predetermined computing process in consideration of the motor efficiency and the like, and controls the power supplied to the motor 38a of the auxiliary compressor 38.

Figure 19:
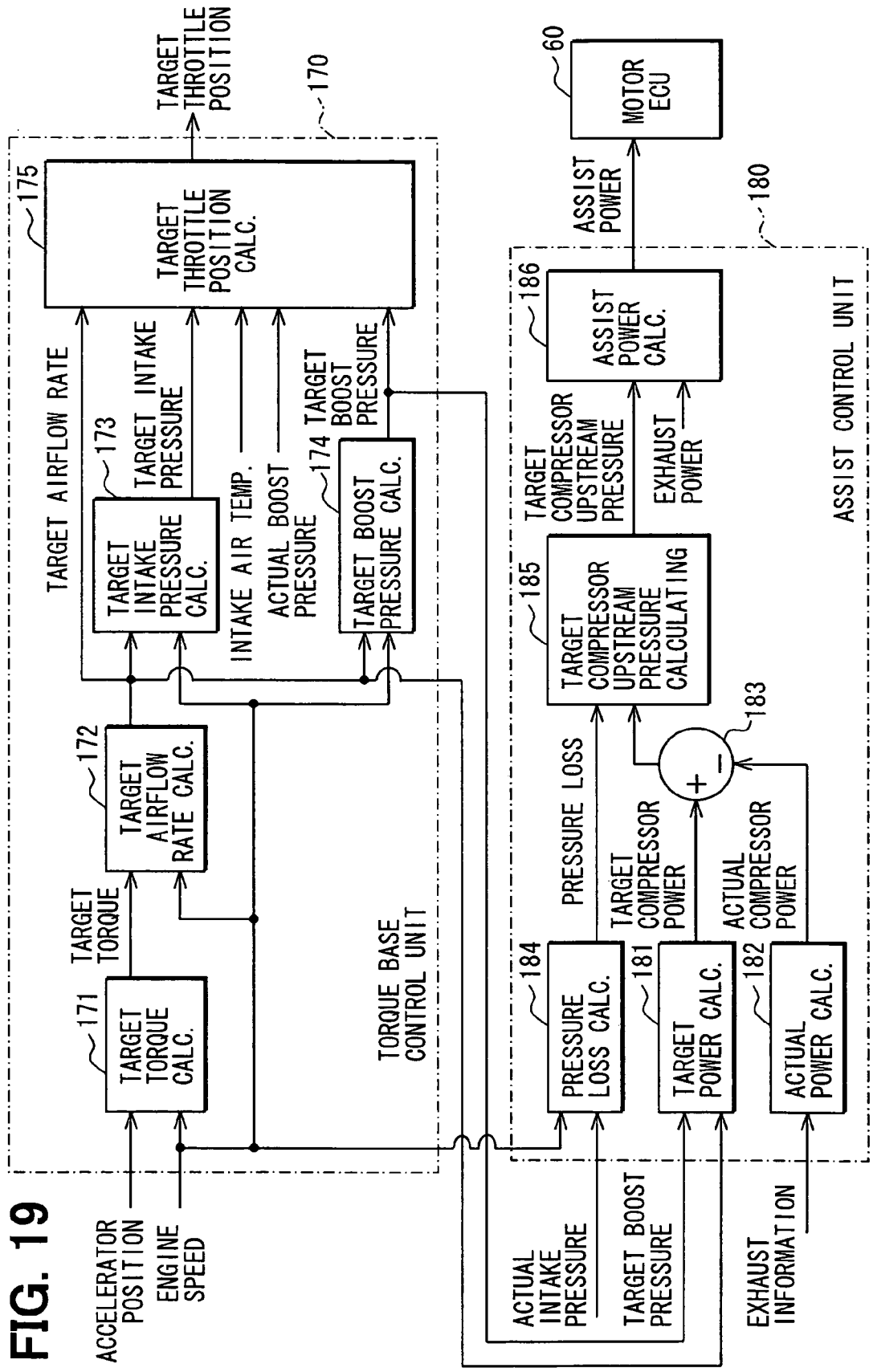
FIG. 19 is a control block diagram illustrating the functions of the engine ECU.

The outline of the control of the engine ECU 50 in the second embodiment will now be described with reference to FIG. 19. FIG. 19 is a control block diagram illustrating the functions of the engine ECU 50.

The system shown in FIG. 19 has, as main functions, a torque base control unit 170 for calculating a target throttle position on the basis of target torque requested by the driver and an assist control unit 180 for calculating the assist power of the auxiliary compressor 38 (motor 38a) to be instructed to the motor ECU 60. The details of the control units 170 and 180 will be described below.

In the torque base control unit 170, a target torque calculating unit 171 calculates a target torque on the basis of the accelerator position and the engine speed, and a target airflow rate calculating unit 172 calculates a target airflow rate on the basis of the target torque and the engine speed. The target airflow rate corresponds to an airflow rate necessary to realize the target torque requested by the driver. A target intake pressure calculating unit 173 calculates target intake pressure (target pressure on the throttle downstream side) on the basis of the target airflow rate and the engine speed, and a target boost pressure calculating unit 174 calculates target boost pressure (target pressure on the throttle upstream side) on the basis of the target airflow rate and the engine speed. A target throttle position calculating unit 175 calculates a target throttle position on the basis of the target airflow rate, target intake pressure, target boost pressure, actual boost pressure, and throttle passed intake temperature. In this case, a target airflow rate [g/rev] is used for calculating the target intake pressure and the target boost pressure. For calculation of the target throttle position, a target airflow rate [g/sec] per unit time obtained by converting the target airflow rate [g/rev] by using the engine speed is used.

In this case, a target throttle position is calculated on the basis of the following basic equation for calculating the throttle passed airflow rate Ga.

$$Ga = f(Thr) \times Pb / \sqrt{T} \times f(Pm/Pb)$$

In the above equation, Thr denotes throttle position, Pb denotes throttle upstream pressure, Pm denotes throttle downstream pressure, and T indicates intake air temperature. In the second embodiment, the throttle passed airflow rate Ga in the basic equation is replaced with a target airflow rate, the throttle position Thr is replaced with a target throttle position, the throttle upstream pressure Pb is replaced with an actual boost pressure, and the throttle downstream pressure Pm is replaced with a target intake pressure, and the target throttle position is calculated on the basis of the target airflow rate, actual boost pressure, target intake air pressure, and the like.

On the other hand, in the assist control unit 180, a target power calculating unit 181 calculates target compressor power on the basis of the target airflow rate and the target boost pressure calculated in the torque base control unit 170. An actual power calculating unit 182 calculates actual compressor power on the basis of exhaust information. A power difference calculating unit 183 calculates the power difference between the target compressor power and the actual compressor power.

Figure 20:
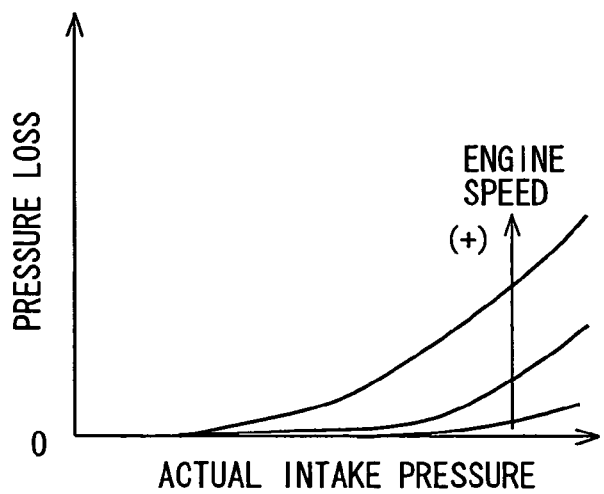
FIG. 20 is a diagram for calculating a pressure loss amount.

A pressure loss calculating unit 184 calculates an amount of pressure loss which occurs in the upstream part of the intake pipe such as an air cleaner, the auxiliary compressor 38, and the like on the basis of the engine speed and an actual intake pressure. At this time, the pressure loss amount is calculated by using, for example, the relation shown in FIG. 20. In FIG. 20, the higher the actual intake pressure or the engine speed is, the larger the pressure loss amount is calculated. The actual intake pressure is an intake pressure (throttle downstream pressure) detected by the intake pressure sensor 17.

Figure 21:
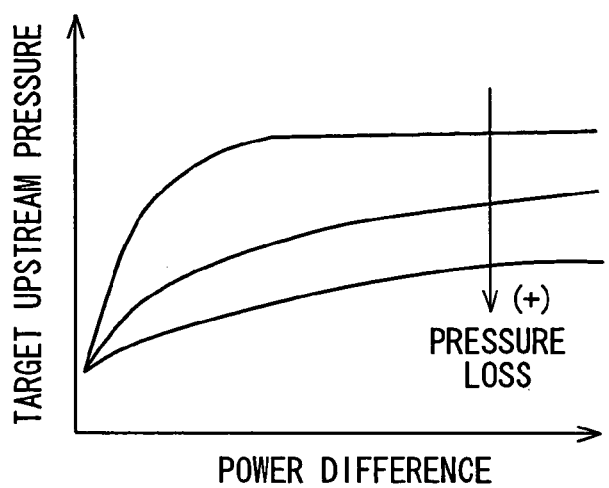
FIG. 21 is a diagram for calculating a target compressor upstream pressure.

A target compressor upstream pressure calculating unit 185 calculates target compressor upstream pressure on the basis of the power difference calculated by the power difference calculating unit 183 and the pressure loss amount calculated by the pressure loss calculating unit 184. The target compressor upstream pressure is target pressure (target compressor input pressure) at the inlet of the compressor impeller 31 of the turbocharger 30 and is calculated by using, for example, the relation shown in FIG. 21. In FIG. 21, the larger the power difference is, the larger the target compressor upstream pressure is calculated. The larger the pressure loss amount is, the lower the target compressor upstream pressure is calculated.

Figure 22:
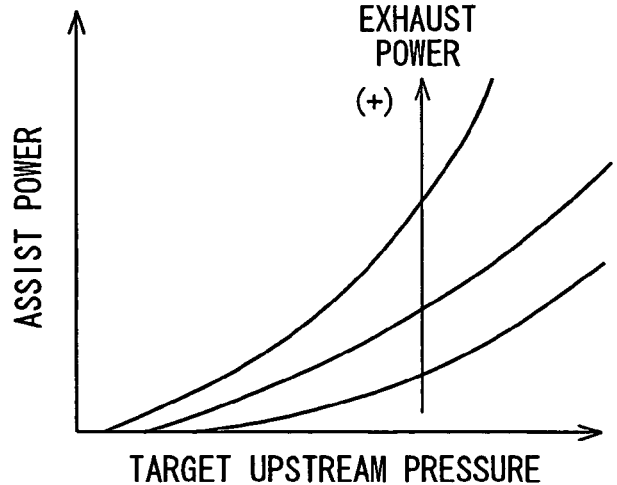
FIG. 22 is a diagram for calculating assist power.

An assist power calculating unit 186 calculates assist power on the basis of the calculated target compressor upstream pressure and an exhaust power and outputs the assist power (motor instruction value) to the motor ECU 60. In this case, the assist power is calculated by using, for example, the relation shown in FIG. 22. In FIG. 22, the higher the target compressor upstream pressure is or the higher the exhaust power is, the higher the assist power is calculated. The exhaust power is calculated on the basis of exhaust characteristics such as exhaust flow rate, exhaust pressure, and exhaust temperature.

In such a case, the assist power of the auxiliary compressor 38 is calculated as an insufficient amount of the actual compressor power for the target compressor power. That is, the compressor power insufficient amount is compensated by the power assist of the auxiliary compressor 38. The assist control unit 180 also calculates an assist amount in power by using power as a unification parameter. Since an instruction value of the motor ECU 60 of a turbo system is a motor output, it is desirable to calculate the assist amount in power.

At the time of calculating the assist power, it is desirable to correct the assist power and set an upper limit guard on the basis of the performance and the operation state of the motor 38*a*, the engine operating state, and the like. In the second embodiment, the upper limit value of the assist power is set by using the motor temperature as a parameter and, by the upper limit value, the upper limit of the assist power is guarded.

Figure 23:
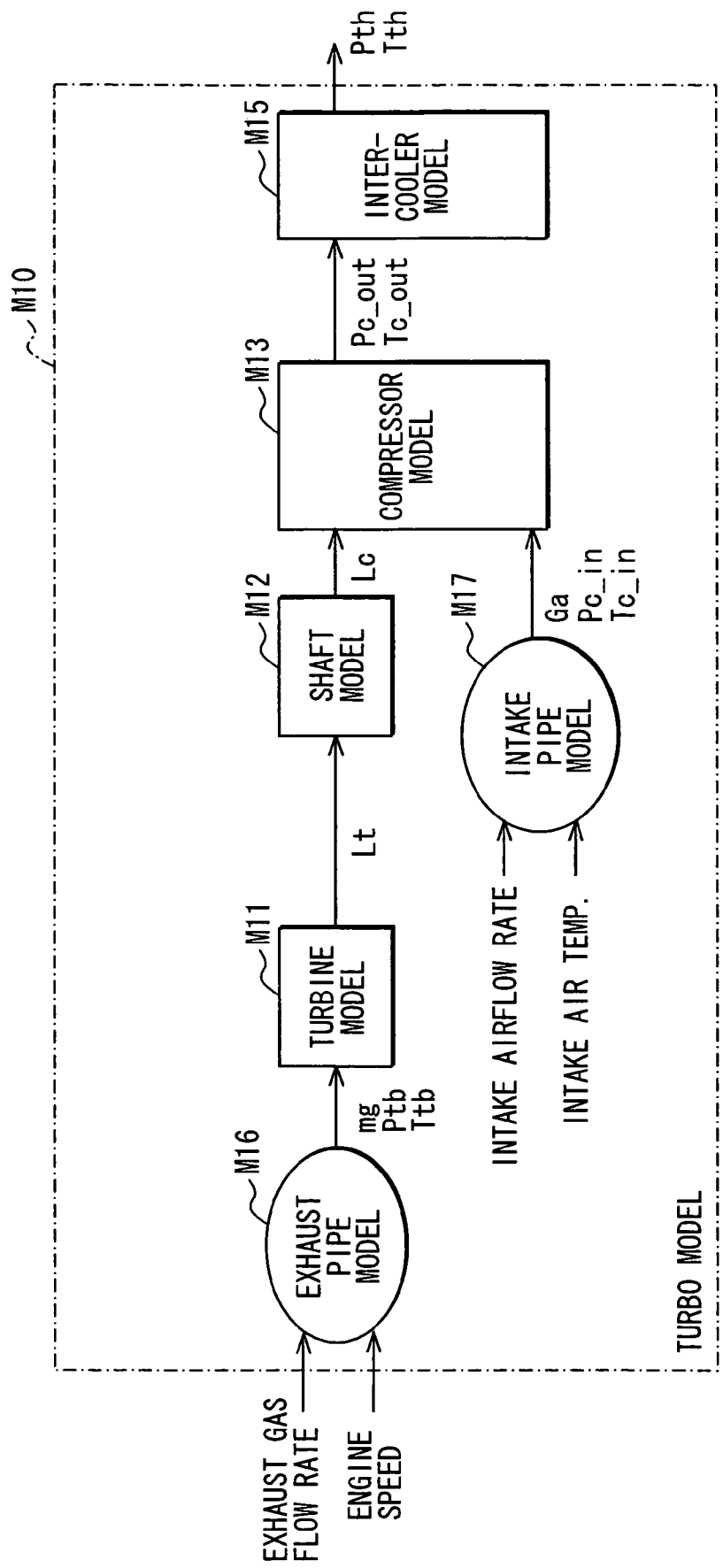
FIG. 23 is a control block diagram showing a turbo model.

In the embodiment, the compressor powers (the target compressor power and the actual compressor power) are calculated in the assist control unit 180 by using a turbo model. The details will be described below. FIG. 23 is a control block diagram showing the turbo model M10. In FIG. 23, the turbo model also includes the inter-cooler 37 provided with the turbocharger 30.

In FIG. 23, the turbine wheel 32, shaft 33, compressor impeller 31, and inter-cooler 37 are modeled as the turbine model M11, the shaft model M12, the compressor model M13, and the inter-cooler model M15, respectively. In addition to the parts models of the turbocharger, the exhaust pipe model M16 in which delay of exhaust and the like is considered and the intake pipe model M17 in which delay of intake and the like is considered are provided.

In the turbo model M10, the turbine model M11, the shaft model M12, and the compressor model M13 are configured by using the flow of energy (power) as a unification parameter on the basis of the principle of supercharging, thereby increasing the convenience (reusability) at the time of reusing the models. In other words, the model once configured can be easily applied to another system. On the basis of the model, modeling of a supercharger having high redundancy and electronized can be easily performed, and a model with high general versatility can be realized.

Figure 24:
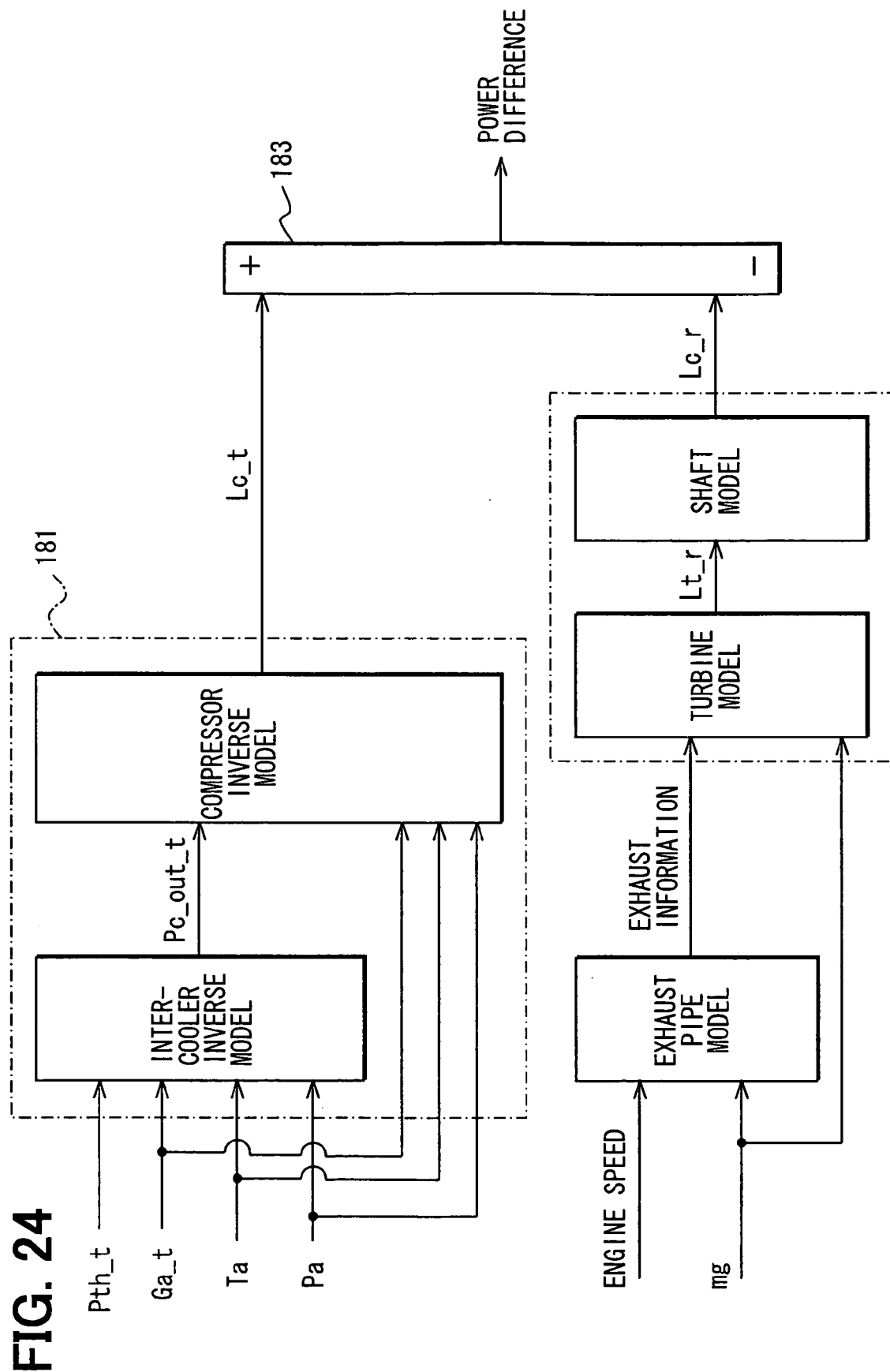
FIG. 24 is a control block diagram showing the details of a target power calculating unit and an actual power calculating unit in the assist control unit.

The target power calculating unit 181 and the actual power calculating unit 182 in the assist control unit 180 of FIG. 19 are configured on the basis of the turbo model M10, and the outline of the units 181 and 182 is shown as a control block diagram of FIG. 24. The target power calculating unit 181 calculates target compressor power Lc_t by inverse calculation (inverse model) of the turbo model M10, and the actual power calculating unit 182 calculates actual compressor power Lc_r by forward calculation (forward model) of the turbo model M10.

In short, the target power calculating unit 181 calculates the target compressor power Lc_t by using the inverse models of the compressor model M13 and the inter-cooler model M15 in FIG. 23 and using the target boost pressure Pth_t (target throttle upstream pressure) and the target airflow rate Ga_t as main computation parameters. In this case, specifically, in the inter-cooler inverse model, by using a map (FIG. 8) based on actual machine data, the target supercharge temperature Tth_t is calculated on the basis of the target boost pressure Pth_t. By making a back calculation expression with the inverse model (of the pressure loss model of the inter-cooler) of FIG. 5 and the inverse model (of the cooling effect model) of FIG. 6, target compressor downstream pressure Pc_out_t is calculated on the basis of the target boost pressure Pth_t (target throttle upstream pressure) and the target supercharge temperature Tth_t (target throttle upstream temperature) and, in addition, the target airflow rate Ga_t, the outside air temperature Ta (compressor upstream temperature), and the atmospheric pressure Pa (compressor upstream pressure).

The actual power calculating unit 182 calculates the actual compressor power Lc_r by exhaust via an exhaust pipe model, a turbine model (forward model), and a shaft model (forward model) in a manner similar to the calculation order of the turbo model. That is, the actual turbine power Lt_r is calculated by using the equation (1) from the exhaust parameters (exhaust flow rate mg, turbine upstream pressure Ptb_in, turbine downstream pressure Ptb_out, turbine upstream temperature Ttb_in, and turbine adiabatic efficiency $\eta g$) of the engine 10 calculated in the exhaust pipe model. Further, by multiplying the actual turbine power Lt_r with power conversion efficiency $\eta t$, the actual compressor power Lc_r is calculated.

The power difference calculating unit 183 calculates the power difference (=Lc_t−Lc_r) between the target compressor power Lc_t and the actual compressor power Lc_r calculated as described above. In the target compressor upstream pressure calculating unit 185 and the assist power calculating unit 186 (see FIG. 19) at the post stage, on the basis of the power difference, target compressor upstream pressure and, further, a request assist power are calculated. After that, an assist power signal (motor instruction value) is output to the motor ECU 60.

The flow of processes performed by the engine ECU 50 will now be described with reference to the flowcharts.

Figure 25:
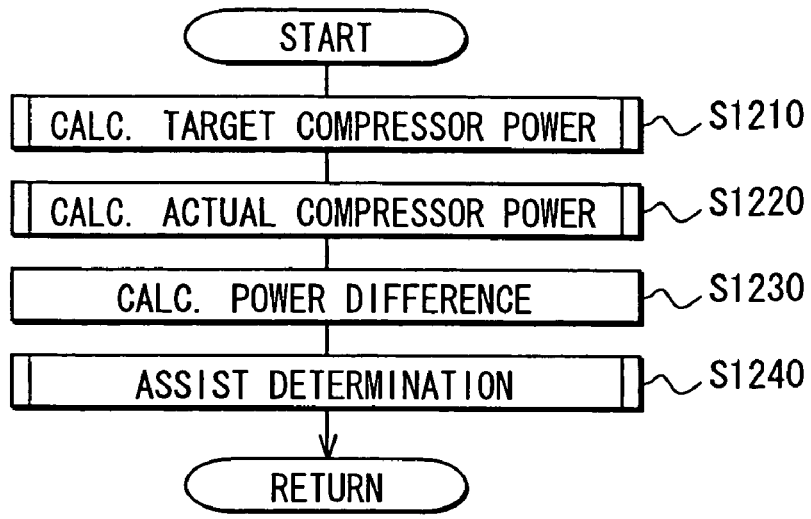
FIG. 25 is a flowchart showing an assist power calculating routine.

In the assist power calculating routine shown in FIG. 25, first, target compressor power is calculated on the basis of the inverse model of the turbo model by using the subroutine of FIG. 26 which will be described later (step S1210). Next, by using the subroutine of FIG. 27 which will be described later, actual compressor power is calculated on the basis of the forward model of the turbo model (step S1220). By subtracting the actual compressor power from the target compressor power, the power difference is calculated (step S1230). By using the subroutine of FIG. 28 which will be described later, whether the power assist can be performed or not is determined (step S1240).

Figure 26:
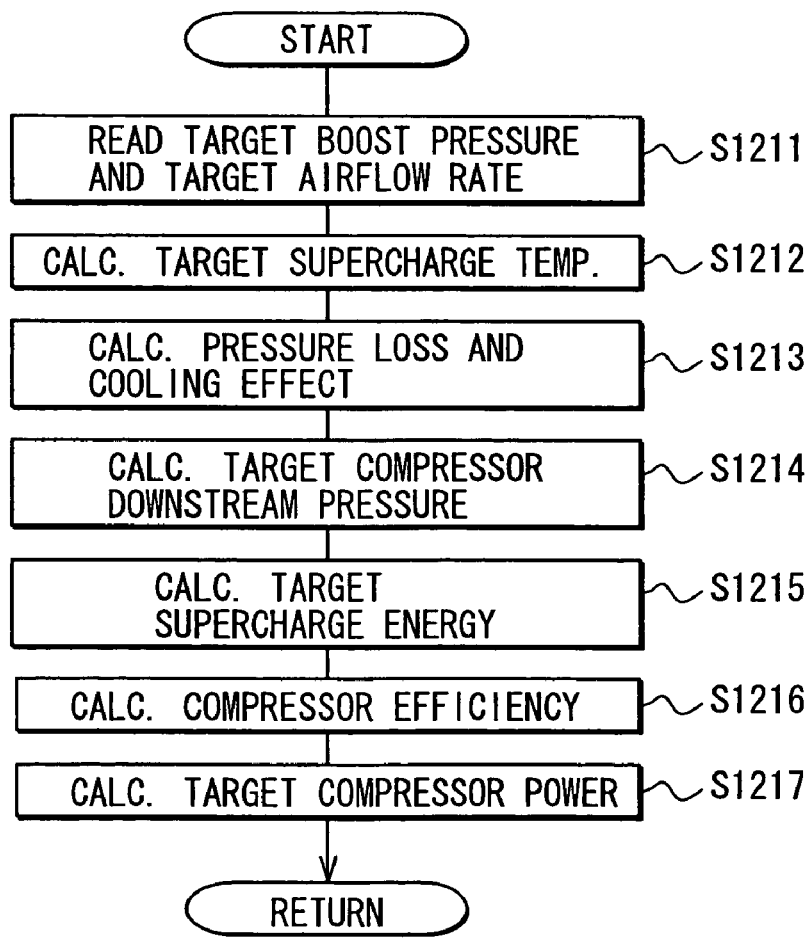
FIG. 26 is a flowchart showing a routine of calculating target compressor power.

In the target compressor power calculating subroutine shown in FIG. 26, the target boost pressure and the target airflow rate are read (step S1211). Subsequently, for example, by using the relation of FIG. 8, the target supercharge temperature is calculated on the basis of the target boost pressure (step S1212). After that, by using the inverse model of the inter-cooler, the target compressor downstream pressure is calculated in consideration of the pressure loss and the cooling effect in the inter-cooler (steps S1213 and S1214). The target supercharge energy is calculated by using the inverse model of the compressor, and the compressor efficiency is calculated by using, for example, the relation of FIG. 9 (steps S1215 and S1216). The target compressor power is calculated from the target supercharge energy and the compressor efficiency (step S1217).

Figure 27:
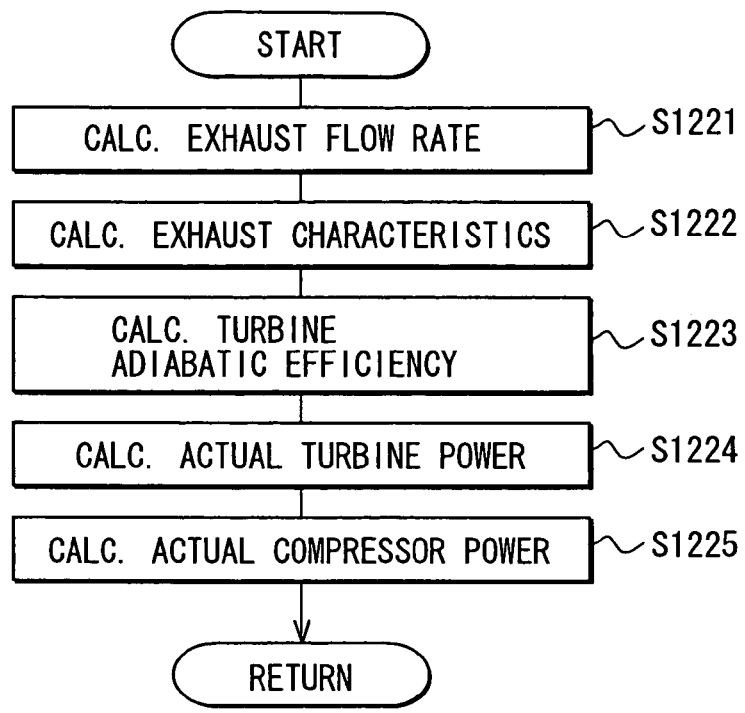
FIG. 27 is a flowchart showing a routine of calculating actual compressor power.

The actual compressor power calculating subroutine shown in FIG. 27 is constructed by an exhaust pipe model part, a turbine model part, and a shaft model part. In the exhaust pipe model part, the exhaust flow rate is calculated in consideration of a delay in reflection of the airflow rate measured by the air flow meter 41 as the exhaust flow rate into the turbine (step S1221). On the basis of the exhaust flow rate, exhaust characteristics (pressures and temperatures on the upstream/downstream sides of the turbine) are calculated (step S1222). The turbine model part calculates the turbine adiabatic efficiency $\eta g$ (step S1223) and calculates the actual turbine power on the basis of the exhaust parameters such as the exhaust flow rate, exhaust pressure, and exhaust temperature and the turbine adiabatic efficiency $\eta g$ (step S1224). Further, the shaft model part calculates the actual compressor power on the basis of the actual turbine power and the power conversion efficiency (step S1225).

Figure 28:
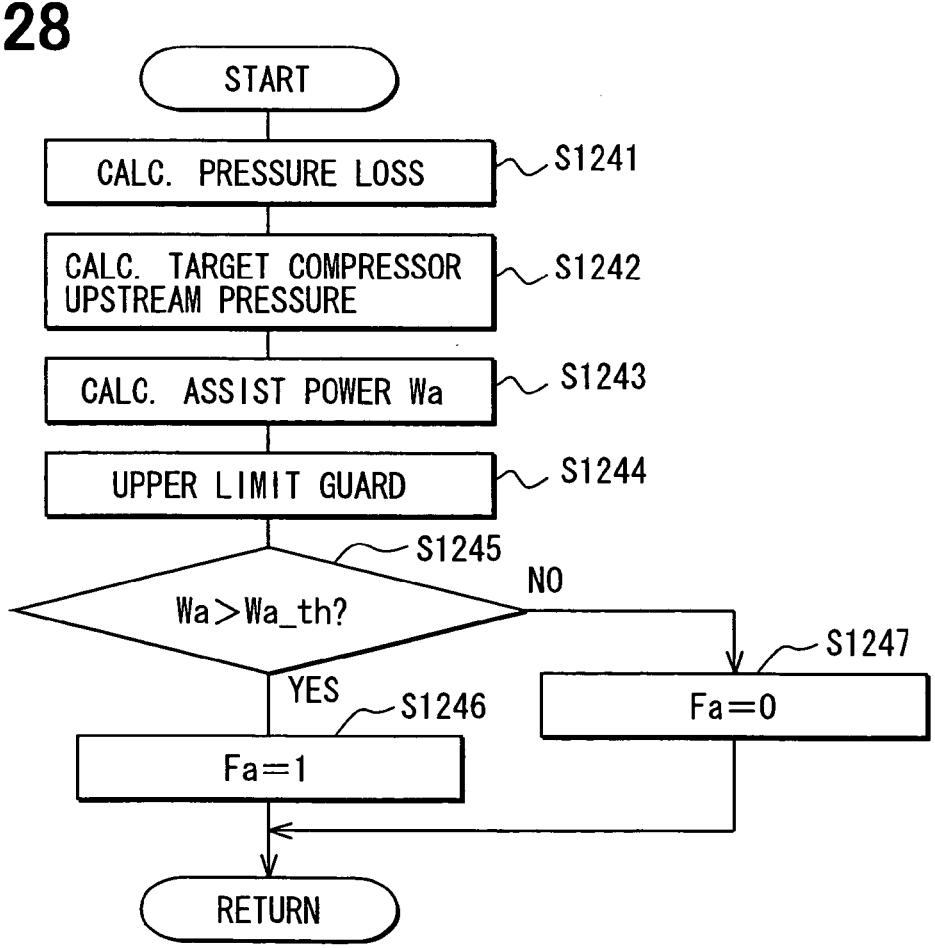
FIG. 28 is a flowchart showing an assist determination routine.

Next, in the assist determining routine shown in FIG. 28, an amount of a pressure loss which occurs in the intake pipe upstream part such as an air cleaner is calculated by using, for example, the relation of FIG. 20 (step S1241). Subsequently, the target compressor upstream pressure is calculated on the basis of the deviation (power difference) of the compressor power and the pressure loss amount by using, for example, the relation of FIG. 21 (step S1242). The assist power Wa is calculated on the basis of the target compressor upstream pressure and exhaust power by using, for example, the relation of FIG. 25 (step S1243). Further, the upper limit guard based on the motor characteristics and the motor temperature is properly set for the assist power Wa (step S1244).

After that, whether the assist power Wa is larger than a predetermined value Wa_th or not is determined (step S1245). When Wa>Wa_th, 1 is set for the assist permit flag Fa. When Wa≦Wa_th, 0 is set for the assist permit flag Fa (steps S1246 and S1247). By the operation, in the case where Wa>Wa_th (the assist permit flag Fa=1), the power assist by the motor 38*a* of the auxiliary compressor 38 is executed. In the case where Wa≦Wa_th (assist permit flag Fa=0), the power assist by the motor 38*a* is stopped.

FIGS. 29A to 29F show time charts showing various behaviors in the case of using the assist control in the second embodiment.

When the accelerator position changes and acceleration starts as shown in FIG. 29A, the target torque increases in accordance with an acceleration request and, in association with the increase, the target boost pressure increases as shown in FIG. 29B. As shown in FIG. 29C, the target compressor power increases, and the actual compressor power increases after the target compressor power. In such a case, the power difference between the target compressor power and the actual compressor power is calculated as shown in FIG. 29D. On the basis of the power difference, the assist power of the auxiliary compressor 38 (motor 38*a*) is calculated as shown in FIG. 29E. By performing the assist control, the actual boost pressure increases so as to trace the target value as shown in FIG. 29F, and improvement in acceleration performance is realized. Simultaneously, the target torque requested by the driver can be also obtained with reliability. After that, when the actual compressor power increases sufficiently with respect to the target compressor power, the assist power is set to zero. In FIG. 29F, the behavior of the actual boost pressure in the case where no power assist is given is shown by the broken line. It is understood that increase in the actual boost pressure lags largely.

As shown in FIG. 29F, the actual boost pressure increases so as to follow the target value as promptly as possible irrespective of the presence/absence of the power assist until it reaches a reference pressure (atmospheric pressure) at the time of increase in the boost pressure. After that, the boost pressure increase ratio largely varies according to whether there is the power assist or not.

By the embodiment described above in detail, the following excellent effects are obtained.

The assist power is calculated on the basis of the power difference between the target compressor power and the actual compressor power in the turbocharger 30, and the power assist of the auxiliary compressor 38 (motor 38a) is controlled by the calculated assist power. Consequently, by using an insufficient amount for the target compressor power as an assist amount, wasteless, efficient assist control can be executed. Since the assist power is calculated by comparison of powers, assist control can be performed more directly with higher response as compared with the case of calculating the assist power by using other parameters such as boost pressure. Thus, the power assist by the auxiliary compressor 38 provided on the compressor upstream side of the turbocharger 30 can be properly controlled and, moreover, fuel consumption, drivability, and the like can be improved.

In particular, the target compressor upstream pressure (the target pressure between the auxiliary compressor 38 and the compressor impeller 31) is calculated on the basis of the power difference between the target compressor power and the actual compressor power, and the assist power is calculated on the basis of the calculated target compressor upstream pressure, so that the upstream pressure (compressor input pressure) of the compressor impeller 31 can be controlled to a pressure adapted to the power difference. Thus, proper power assist which is not excessive or insufficient can be realized.

Since the target turbine power is calculated on the basis of the target airflow rate used for torque control (airflow rate control) of the engine, the throttle valve 14 (airflow rate adjusting means) and the auxiliary compressor 38 (auxiliary supercharging device) are controlled interlockingly, precision of the torque control improves. Therefore, an engine output is prevented from becoming excessive or insufficient and drivability and the like can be further improved.

By using the electric turbo model M10 as a physical model expressing the flow of power in the turbocharger 30, the target compressor power is calculated with the inverse model of the turbo model (inverse models of the inter-cooler and the compressor), and the actual compressor power is calculated by the forward models of the turbo models (forward models of the turbine and the shaft). Thus, the target compressor power and the actual compressor power can be calculated with high precision, and the precision of the power assist control can be improved.

By using the auxiliary compressor 38 separated from the turbocharger 30 as the auxiliary supercharging device, without forcing an existing turbo system to be largely modified or re-adapted, a preferable power assist supercharging system can be configured.

The present invention is not limited to the description of the embodiment and may be carried out as follows.

Although the auxiliary compressor 38 (auxiliary supercharging device) is provided on the compressor upstream side of the turbocharger 30 in the intake pressure 11 in the second embodiment, in place of the configuration, an auxiliary compressor (auxiliary supercharging device) may be provided on the compressor downstream side of the turbocharger 30. In this case, the target compressor downstream pressure (target pressure on the compressor output side) is calculated on the basis of the power difference between the target compressor power and the actual compressor power, and the assist power is calculated on the basis of the target compressor downstream pressure. Thus, the downstream pressure of the compressor impeller 31 (compressor output pressure) can be controlled to pressure adapted to the power difference, and proper power assist which is not excessive or insufficient can be realized.

In the embodiment, the power difference between the target compressor power and the actual compressor power of the turbo charger 30 is calculated and, on the basis of the power difference, a motor assist amount is calculated. The configuration may be changed to calculate the power difference between the target turbine power and the actual turbine power of the turbocharger 30 and, on the basis of the power difference, calculate the motor assist amount.

In the embodiment, assist power is calculated as the assist amount of the auxiliary compressor 38, and the auxiliary compressor 38 (motor 38a) is driven so as to realize the assist power. Alternately, a configuration may be employed in which the compressor rotational speed is calculated as the assist amount and the driving of the auxiliary compressor 38 (motor 38a) is controlled so as to realize the compressor rotational speed.

In the embodiment, calculation of the compressor powers (the target compressor power and the actual compressor power) in the assist control unit 180 is executed with the turbo model. The method may be changed to another method. For example, the target compressor power and the actual compressor power may be calculated by map computation.

Although the target boost pressure is calculated on the basis of the target airflow rate calculated from the target torque in the torque base control unit 170 (FIG. 19) in the foregoing second embodiment, instead, the target boost pressure may be calculated directly from the target torque.

Although the actual boost pressure is obtained from the detection value of the boost pressure sensor 12 and the target throttle position is calculated by using the actual boost pressure in the embodiment, alternately, it is also possible to obtain an actual boost pressure by estimation and calculate the target throttle position by using the estimation value. Concretely, the turbo model described with reference to FIG. 23 is used and the boost pressure obtained as an output of the model is used as the estimation value of the actual boost pressure.

In place of the configuration of calculating the target compressor upstream pressure (the target pressure between the auxiliary compressor 38 and the compressor impeller 31) on the basis of the power difference between the target compressor power and the actual compressor power, a configuration of calculating the target compressor upstream pressure on the basis of engine operating conditions and the like may be employed. The assist power is calculated on the basis of the target compressor upstream pressure. In this case, the actual compressor upstream pressure is measured by a sensor or the like, and feedback control may be performed so that the measurement value becomes the target compressor upstream pressure. With the configuration, the compressor upstream pressure can be controlled to a desired pressure. Consequently, the proper power assist which is not excessive or insufficient can be realized.

With the configuration, at the time of calculating the assist power, a pressure loss amount (an amount of pressure loss occurring in the intake pipe upstream part) and an exhaust power may be added as computation parameters.

By comparison between actual boost pressure and predetermined reference pressure, the assist timing of the auxiliary compressor 38 may be determined. Specifically, whether the actual boost pressure has reached the predetermined reference pressure or not is determined. Before it is determined that the actual boost pressure has reached the reference power, the power assist by the auxiliary compressor 38 is stopped. The "reference pressure" is, for example, atmospheric pressure. That is, at the time of rise in the boost pressure, the actual boost pressure rises promptly so as to follow a target value irrespective of the presence or absence of the power assist until it reaches the reference pressure (atmospheric pressure). After that, the increase ratio of the boost pressure largely varies according to the presence or absence of the power assist. Therefore, it can be said that the power assist is substantially unnecessary until the actual boost pressure reaches the reference pressure (atmospheric pressure). Thus, by stopping the power assist until the actual boost pressure reaches the reference pressure as described above, energy consumption by the power assist can be reduced.

Third Embodiment

Figure 30:
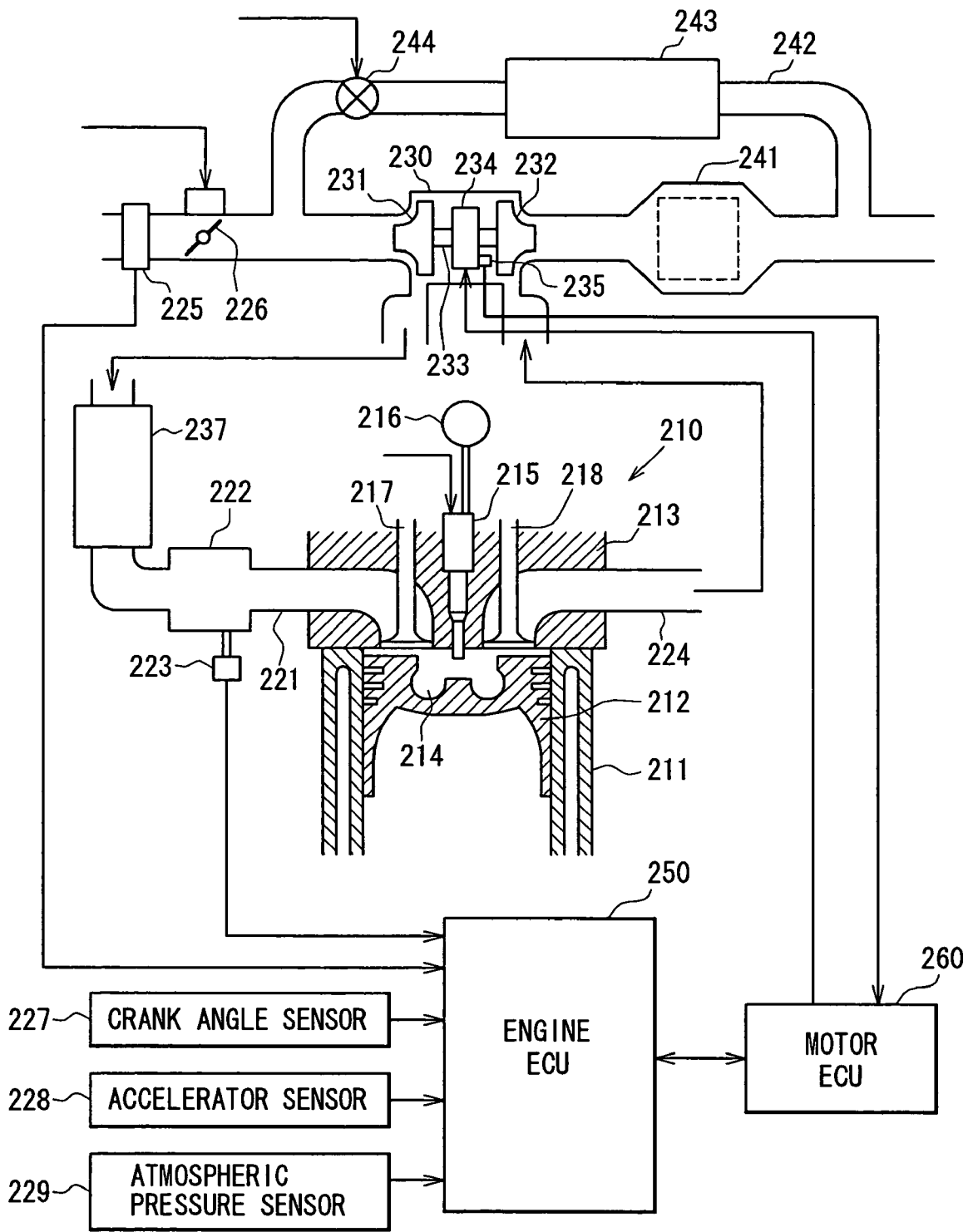
FIG. 30 is a diagram showing a schematic configuration of an engine control system in a third embodiment of the invention.

FIG. 30 is a general schematic configuration diagram of an engine control system.

In an engine 210 shown in FIG. 30, a piston 212 is housed in a cylinder block 211, and a combustion chamber 214 is defined by the cylinder inner walls, the piston 212, and a cylinder head 213. In the cylinder head 213, an electrically-controlled fuel injection valve 215 is disposed. A high-pressure fuel is supplied from a common rail 216 to the fuel injection valve 215, and the fuel is injected into the combustion chamber 214 by an opening operation of the fuel injection valve 215. Although not shown, the system has a fuel pump for pressure-feeding the fuel in a fuel tank to the common rail 216. A fuel discharge amount of the fuel pump is controlled on the basis of a pressure (fuel pressure) in the common rail detected by a sensor or the like.

An intake valve 217 is disposed for an intake port, and an exhaust valve 218 is disposed for an exhaust port. An exhaust pipe 221 is connected to the intake port, and an inter-cooler 237 is disposed on the upstream side of a surge tank 222 in the intake pipe 221. For the surge tank 222, an intake pressure sensor 223 for detecting intake pipe pressure (which is also boost pressure of a turbocharger which will be described later) is provided. An exhaust pipe 224 is connected to an exhaust port.

A turbocharger 230 is disposed between the intake pipe 221 and the exhaust pipe 224. The turbocharger 230 has a compressor impeller 231 provided for the intake pipe 221 and a turbine wheel 232 provided for the exhaust pipe 224. The compressor impeller 231 and the turbine wheel 232 are coupled to a shaft 233. The shaft 233 is provided with a motor (electric motor) 234 as a power assist device. The motor 234 operates on power supplied from a battery (not shown) and assists rotation of the shaft 233. The motor 234 is provided with a temperature sensor 235 for detecting the motor temperature.

In the turbocharger 230, the turbine wheel 232 is rotated by exhaust flowing in the exhaust pipe 224. The rotational force is transmitted to the compressor impeller 231 via the shaft 233. By the compressor impeller 231, intake air flowing in the intake pipe 221 is compressed and supercharging is performed. The air supercharged in the turbocharger 230 is cooled by the inter-cooler 237 and, after that, the cooled air is supplied to the downstream side.

By cooling the intake air by the inter-cooler 237, the intake air charging efficiency is increased.

A not-shown air cleaner is provided in the uppermost part of the intake pipe 221. On the downstream side of the air cleaner, an air flow meter 225 for detecting an intake airflow rate and a throttle valve 226 driven by a step motor are provided. In addition, the control system has various sensors such as a crank angle sensor 227 for outputting a rectangular-shaped crank angle signal every predetermined crank angle (for example, every 30° C.) with rotation of the engine 210, an accelerator position sensor 228 for detecting a stroke amount of the acceleration pedal (accelerator position), and an atmospheric pressure sensor 229 for detecting an atmospheric pressure.

A catalyst device 241 having therein an NOx absorbent is provided on the turbine downstream side of the turbocharger 230 in the exhaust pipe 224. Further, an EGR path 242 is provided between the compressor upstream side of the turbocharger 230 in the intake pipe 221 and the downstream of the catalyst device 241 in the exhaust pipe 224. In midpoints of the EGR path 242, an EGR inter-cooler 243 for cooling EGR gas by engine cooling water or the like and an EGR control valve 244 driven by a step motor are disposed.

An engine ECU (Electronic Control Unit) 250 is constructed, as it is known, by using a microcomputer as a main body including a CPU, a ROM, and a RAM. By executing various control programs stored in the ROM, the engine ECU 250 executes various controls on the engine 210 in accordance with the engine operating state. Specifically, various detection signals are input to the engine ECU 250 from the above-described various sensors. The engine ECU 250 computes a fuel injection amount, a throttle valve control amount, an EGR control amount, a fuel pressure control amount, and the like on the basis of the various detection signals which are input and, on the basis of the computed amounts, controls the driving of the fuel injection valve 215, throttle valve 226, EGR control valve 244, a fuel pump, and the like.

In the embodiment, fuel injection amount control by so-called torque base control is executed to control the fuel injection amount to a target value by using torque generated in the engine 210 as a reference. Briefly, the engine ECU 250 computes target torque (required torque) on the basis of a detection signal of the accelerator position sensor 228, computes a target fuel injection amount satisfying the target torque, and controls driving of the fuel injection valve 215 in response to a control instruction signal based on the target fuel injection amount.

The engine ECU 250 determines an amount of control on the motor 234, of the turbocharger 230 interlockinly with the torque base control so that assist power is added to the turbocharger 230 at the time of acceleration and desired boost pressure can be obtained as promptly as possible. Specifically, the engine ECU 250 computes target assist power, power assist timing, and the like on the basis of the target fuel injection amount and the target boost pressure calculated according to the target torque, and outputs the computation results to a motor ECU 260. The motor ECU 260 receives a signal from the engine ECU 250, performs predetermined computing process in consideration of the motor efficiency and the like, and controls the power to be supplied to the motor 234.

Figure 31:
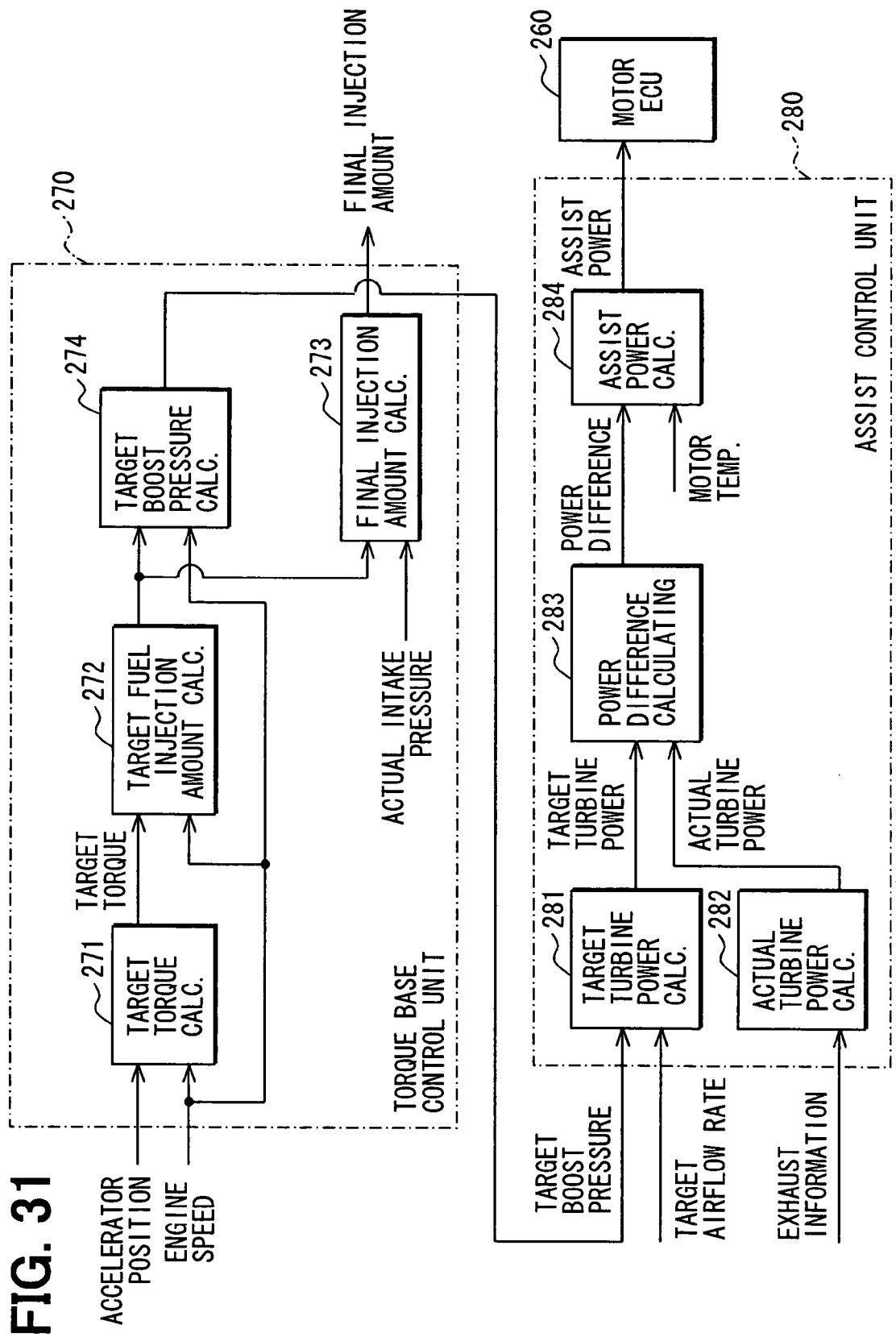
FIG. 31 is a control block diagram illustrating the functions of an engine ECU.

Next, the outline of the control of the engine ECU 250 in the embodiment will be described with reference to FIG. 31. FIG. 31 is a control block diagram illustrating the functions of the engine ECU 250.

The system shown in FIG. 31 has, as main functions, a torque base control unit 270 for calculating a target fuel injection amount on the basis of the target torque requested by the driver and an assist control unit 280 for calculating the assist power of the motor 234 to be instructed to the motor ECU 260. The details of the control units 270 and 280 will be described below.

In the torque base control unit 270, a target torque calculating unit 271 calculates target torque on the basis of the accelerator position and the engine speed, and a target fuel injection amount calculating unit 272 calculates a target fuel injection amount on the basis of the target torque and the engine speed. The target fuel injection amount corresponds to a fuel amount necessary to realize the target torque requested by the driver. A final injection amount calculating unit 273 calculates a final injection amount on the basis of the target fuel injection amount and actual intake air pressure. In this case, a smoke guard (the upper limit value for setting a smoke generation amount to be within a permissible range) is set on the basis of the actual intake air pressure and the like. By the smoke guard, the upper limit of the target fuel injection amount is guarded, and a final fuel injection amount is determined. The higher the actual intake air pressure is, the larger the smoke guard is set. By the setting of the smoke guard, the target torque can be realized while suppressing generation of smokes. The actual intake pressure is intake pressure detected by the intake pressure sensor 223 (boost pressure generated by the turbocharger).

A target boost pressure calculating unit 274 calculates target boost pressure on the basis of the target fuel injection amount and the engine speed.

On the other hand, in the assist control unit 280, a target turbine power calculating unit 281 calculates target turbine power on the basis of a target airflow rate calculated from a map or the like and the target boost pressure calculated by the torque base control unit 270. The target airflow rate is calculated in accordance with the target boost pressure on the basis of the airflow rate actually measured by the air flow meter 225. In place of the map computation, the target airflow rate can be also calculated by estimation using a model. An actual turbine power calculating unit 282 calculates actual turbine power on the basis of exhaust information. A power difference calculating unit 283 calculates the power difference between the target turbine power and the actual turbine power. An assist power calculating unit 284 calculates assist power on the basis of the calculated power difference and outputs the assist power to the motor ECU 260.

In such a case, the assist power of the motor 234 is calculated as an insufficient amount of the actual turbine power for the target turbine power. That is, the insufficient amount of the turbine power is compensated by the motor assist. In the assist control unit 280, a motor assist amount is also calculated in power by using the power as a unification parameter. Since the instruction value of the motor ECU 260 of an existing electric turbo system is a motor output, it is desirable to calculate the motor assist amount in power.

At the time of calculating the assist power, it is desirable to correct the assist power or set an upper limit guard on the basis of the performances and the operation state of the motor 234, engine operating states, and the like. In the embodiment, the upper limit value of the assist power is set by using the motor temperature (detection value of the temperature sensor 235) as a parameter and, by the upper limit value, the upper limit of the assist power is guarded.

The power difference calculating unit 283 calculates the power difference between target turbine power $Lt\_t$ calculated as described above and actual turbine power $Lt\_r$ (the power difference=$Lt\_t-Lt\_r$), and calculates a request assist power Wa from the power difference. An upper limit guard, EGR correction, and the like are properly performed on the request assist power Wa. After that, an assist power signal (motor instruction value) is output to the motor ECU 260.

The flow of calculating process by the engine ECU 250 will now be described. Description of the same processes as those of the first and second embodiments will not be repeated.

Figure 32:
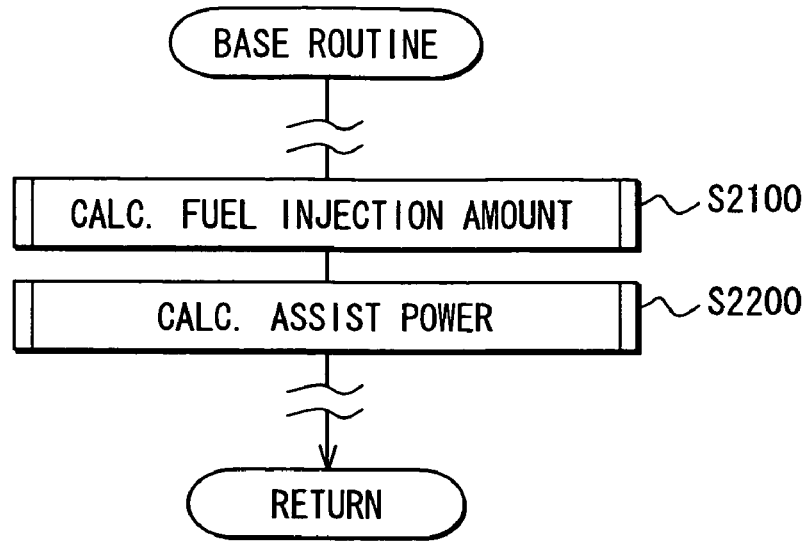
FIG. 32 is a flowchart showing a base routine performed by the engine ECU.
Figure 33:
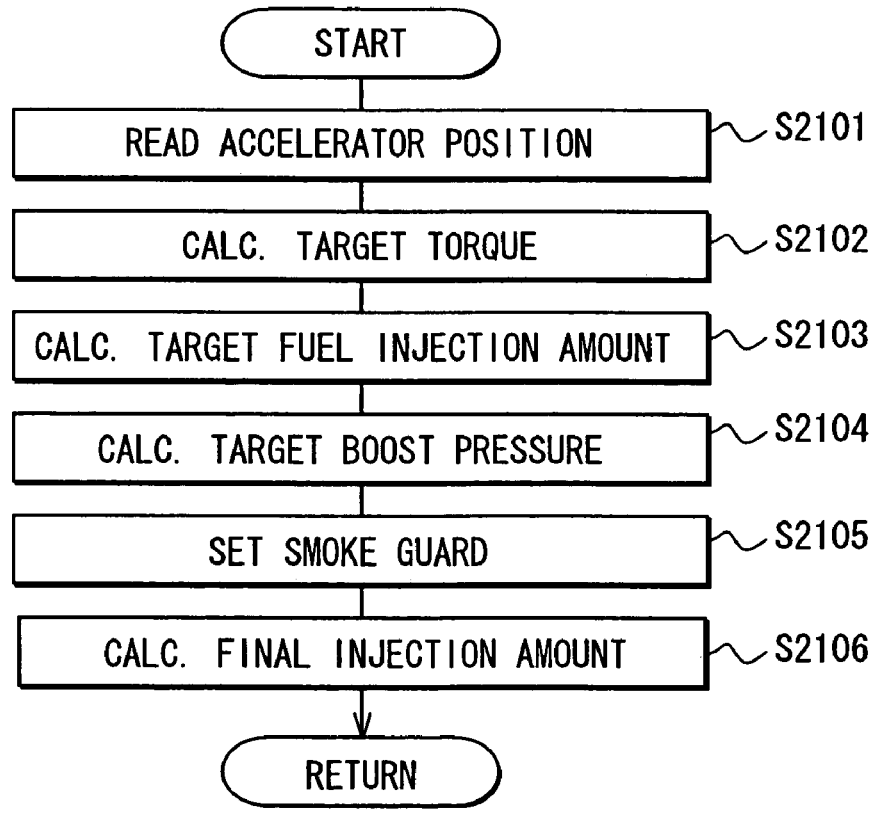
FIG. 33 is a flowchart showing a fuel injection amount calculating routine.

As shown in FIG. 32, the base routine has a fuel injection amount calculating routine (step S2100) and an assist power calculating routine (step S2200). FIG. 33 shows the details of the fuel injection amount calculating routine.

In the fuel injection amount calculating routine shown in FIG. 33, first, an acceleration position detection value is read (step S2101) and target torque is calculated on the basis of the accelerator position and the engine speed (step S2102). A target fuel injection amount is calculated on the basis of the target torque and the engine speed (step S2103) and a target boost pressure is calculated on the basis of the target fuel injection amount and the engine speed (step S2104). After that, a smoke guard is set on the basis of an actual intake pressure (actual boost pressure), fuel pressure and other engine operating conditions (step S2105). Finally, by using the smoke guard as an upper limit value, a final injection amount is calculated (step S2106).

FIGS. 34A to 34F are time charts showing various behaviors in the case of using the assist control in the embodiment.

When the accelerator position changes and acceleration starts as shown in FIG. 34A, the target torque increases according to the acceleration request as shown in FIG. 34B. In association with the increase, the target fuel injection amount increases as shown in FIG. 34D. At this time, the target boost pressure increases as shown in FIG. 34C. An actual fuel injection amount changes while being regulated (smoke-guarded) in accordance with a change in the actual boost pressure. The target turbine power increases as shown in FIG. 34E, and actual turbine power increases after the target turbine power increases. In such a case, the power difference (the hatched part in FIG. 34E) between the target turbine power and the actual turbine power is calculated and is used as the assist power of the motor 234. By executing the assist control in such a manner, actual torque and boost pressure increase so as to trace target values, and improvement in acceleration performance is realized. After that, when the actual turbine power increases sufficiently with respect to the target turbine power, the assist power is set to zero and the power assist by the motor 234 is stopped. At this time, the power difference between the target turbine power and the actual turbine power becomes zero or very small. In a state where the power assist is substantially unnecessary, execution of the power assist is inhibited.

In the foregoing embodiment described in detail above, the following excellent effects are obtained.

By controlling the power assist as described above, the response of the actual boost pressure is improved. Consequently, the regulation (smoke guard) of the fuel injection amount performed on the basis of the actual boost pressure is loosened, and a fuel can be increased for an acceleration request or the like. Therefore, excellent acceleration response can be obtained when an acceleration request is given.

In the configuration of executing the engine torque control (fuel injection amount control) on the basis of the target fuel injection amount calculated from the target torque, the target turbine power is calculated on the basis of the target airflow rate calculated from the target torque like the target fuel injection amount. Consequently, the fuel injection valve 215 (fuel injecting means) and the motor 234 (power assist device) are controlled interlockingly, and the precision of the torque control improves. Therefore, the engine output is prevented from being excessive or insufficient, and drivability and the like can further improve.

What is claimed is:

1. A controller for an internal combustion engine with a supercharger having a turbine wheel and a compressor impeller, the controller being applied to an internal combustion engine including a supercharger for supercharging intake air by exhaust power and a power assist device attached to the supercharger and directly assisting power of the supercharger, the controller controlling output torque of the internal combustion engine by adjusting an amount of air taken into the internal combustion engine by an airflow rate adjusting means, said controller comprising:

target airflow rate calculating means that calculates a target airflow rate based on a target torque corresponding to a request of a driver;

actual airflow rate calculating means that calculates an actual airflow rate actually flowing in an intake air path by estimation or measurement at a time of performing the airflow rate control by the airflow rate adjusting means;

target pressure calculating means that calculates target boost pressure based on the target torque;

target power calculating means that calculates target turbine power of the turbine wheel based on an airflow rate information representing at least target airflow rate and target boost pressure;

actual power calculating means that calculates actual turbine power of the turbine wheel based on exhaust parameters representing at least exhaust flow rate, turbine upstream pressure, turbine downstream pressure, and turbine upstream temperature;

assist amount calculating means that calculates an assist amount of the power assist device based on a power difference between the target turbine power and actual turbine power of the turbine wheel, the assist power amount corresponding to an insufficient amount of the actual turbine power relative to the target turbine power, the assist power amount being varied along with a variation in the power difference; and assist control means that controls the power assist device by the calculated assist amount in such a manner that when the assist power amount of the power assist device is lower than or equal to a predetermined value, the power assist device is stopped, wherein the above-referenced power parameters are rates of energy flow.

2. A controller for an internal combustion engine with a supercharger applied to an internal combustion engine having a supercharger for supercharging intake air by exhaust power and a power assist device attached to the supercharger and directly assisting power of the supercharger, the controller comprising:

target power calculating means that calculates target power of the supercharger based on an operating state of the internal combustion engine;

actual power calculating means that calculates an actual power of the supercharger;

assist amount calculating means that calculates an assist amount of the power assist device based on a power difference between the target power and an actual power of the supercharger, the assist power amount corresponding to an insufficient amount of the actual power relative to the target power, the assist power amount being varied along with a variation in the power difference;

assist control means that controls the power assist device by the calculated assist amount in such a manner that when the assist power amount of the power assist device is lower than or equal to a predetermined value, the power assist device is stopped, wherein the above-referenced power parameters are rates of energy flow, and means that obtains an exhaust parameter of exhaust from the internal combustion engine by estimation or measurement, wherein the actual power calculating means calculates an actual power of the supercharger based on the exhaust parameter.

3. A controller for an internal combustion engine with a supercharger according to claim 1, wherein:

a turbine wheel is rotated by exhaust power and a compressor impeller is coupled to the turbine wheel via a shaft, the shaft is provided with an electric motor as the power assist device, and the internal combustion engine performs supercharging by compressing intake air by rotation of the compressor impeller, turbo models of components of the turbocharger are used, the turbo models express flow of power from the turbine wheel to the compressor impeller, the actual power calculating means calculates the actual turbine power of the turbine by using, at least, a turbine model of the turbine wheel among the turbo models, and the target power calculating means calculates target turbine power of the turbine by using, at least, a compressor model of the compressor impeller among the turbo models.

4. A controller for an internal combustion engine with a supercharger according to claim 3, wherein:

the actual power calculating means calculates actual turbine power of the turbine by a forward calculation of the turbo model by using exhaust information as an input parameter, and the target power calculating means calculates target power of the turbine by an inverse calculation of the turbo model by using boost pressure information and intake information as input parameters.

5. A method for controlling a power-assisted supercharger of intake air on an internal combustion engine, the supercharger having a turbine wheel and a compressor impeller and being powered by engine exhaust and a power assist device where output torque of the internal combustion engine is controlled by adjusting engine intake air, said method comprising:

calculating a target airflow rate based on a target torque corresponding to a request of a driver;

calculating an actual airflow rate actually flowing in an intake air path by estimation or measurement when performing airflow control;

calculating a target boost pressure based on the target torque;

calculating target turbine power for the turbine wheel of the supercharger based on intake airflow rate information representing at least target airflow rate, actual airflow rate and target boost pressure;

calculating actual turbine power being developed by the supercharger turbine wheel based on exhaust parameters representing at least exhaust flow rate, turbine upstream pressure, turbine downstream pressure, and turbine upstream temperature;

calculating an amount of power assistance based on a power difference between target turbine power and actual turbine power of the turbine wheel, the amount of power assistance corresponding to an insufficient amount of the actual turbine power relative to the target turbine power, the amount of power assistance varying along with a variation in the power difference; and controlling assistance power supplied to the supercharger by the calculated amount in such a manner that when the amount of power assistance of the power assist device is lower than or equal to a predetermined value, the power assist device is stopped, wherein the above-referenced power parameters are rates of energy flow.

6. A method for controlling a power assisted supercharger of intake air on an internal combustion engine, said supercharger being powered by exhaust and a power assist device, and said method comprising:

calculating target power of the supercharger based on an operating state of the internal combustion engine;

calculating an actual power of the supercharger;

calculating a power assist amount based on a power difference between the target power and actual power of the supercharger, the power assist amount corresponding to an insufficient amount of the actual power relative to the target power, the power assist amount being varied along with a variation in the power difference; and controlling the power assist device by the calculated power assist amount in such a manner that when the power assist amount of the power assist device is lower than or equal to a predetermined value, the power assist device is stopped, wherein the above-referenced power parameters are rates of energy flow, and obtaining an exhaust parameter of exhaust from the internal combustion engine by estimation or measurement, wherein the actual power is calculated as an actual power of the supercharger based on the exhaust parameter.

7. The method of claim 5, wherein the turbine wheel is rotated by engine exhaust and a compressor impeller is coupled to the turbine wheel via shaft, the shaft being provided with an electric motor as a power assist device, and engine intake air is compressed by rotation of the compressor impeller, and wherein:

actual turbine power of the turbine is calculated by using, at least, a turbine model of the turbine wheel, and target turbine power of the turbine is calculated using a compressor model of the compressor impeller.

8. The method of claim 7, wherein:

actual turbine power of the turbine is calculated by a forward calculation of the turbo model by using exhaust information as an input parameter, and target turbine power of the turbine is calculated by an inverse calculation of the turbo model using boost pressure information and intake information as input parameters.

* * * * *